United States Patent
Ashari et al.

(10) Patent No.: US 10,223,762 B2
(45) Date of Patent: Mar. 5, 2019

(54) PIPELINED APPROACH TO FUSED KERNELS FOR OPTIMIZATION OF MACHINE LEARNING WORKLOADS ON GRAPHICAL PROCESSING UNITS

(71) Applicant: International Business Machines Corporation, Armonk, NY (US)

(72) Inventors: Arash Ashari, Kirkland, WA (US); Matthias Boehm, San Jose, CA (US); Keith W. Campbell, Ottawa (CA); Alexandre Evfimievski, San Jose, CA (US); John D. Keenleyside, Pickering (CA); Berthold Reinwald, San Jose, CA (US); Shirish Tatikonda, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/924,029

(22) Filed: Mar. 16, 2018

(65) Prior Publication Data
US 2018/0211357 A1 Jul. 26, 2018

Related U.S. Application Data

(63) Continuation of application No. 14/813,522, filed on Jul. 30, 2015, now Pat. No. 9,972,063.

(51) Int. Cl.
*G06T 1/20* (2006.01)
(52) U.S. Cl.
CPC .................................... *G06T 1/20* (2013.01)

(58) Field of Classification Search
None
See application file for complete search history.

(56) References Cited

U.S. PATENT DOCUMENTS

| 7,219,085 | B2 | 5/2007 | Buck et al. |
| 8,930,926 | B2 | 1/2015 | Bastoul et al. |
| 9,972,063 | B2 * | 5/2018 | Ashari .................. G06T 1/20 |
| 2013/0091507 | A1 * | 4/2013 | Wu ....................... G06F 9/5038 718/104 |

(Continued)

OTHER PUBLICATIONS

'Dataflow-Driven GPU Performance Projection for Multi-Kernel Transformations', by Jiayun Meng, Vitali A. Morozov, Venkatram Vishwanath, and Kalyan Kumaran, IEEE Conferences, 2012 International Conference for High Performance Computing, (Year: 2012).*

(Continued)

*Primary Examiner* — James A Thompson
(74) *Attorney, Agent, or Firm* — Sherman IP LLP; Kenneth L. Sherman; Steven Laut

(57) ABSTRACT

A method for optimization of machine learning (ML) workloads on a graphics processor unit (GPU). The method includes identifying a computation having a generic pattern commonly observed in ML processes. Hierarchical aggregation spanning a memory hierarchy of the GPU for processing is performed for the identified computation including maintaining partial output vector results in shared memory of the GPU. Hierarchical aggregation for vectors is performed including performing intra-block aggregation for multiple thread blocks of a partial output vector results on GPU global memory.

20 Claims, 15 Drawing Sheets

(56) References Cited

U.S. PATENT DOCUMENTS

| | | | | |
|---|---|---|---|---|
| 2013/0222399 | A1* | 8/2013 | Bourd | G06T 1/20 345/506 |
| 2015/0088954 | A1* | 3/2015 | Bakos | G06F 17/16 708/607 |
| 2015/0324707 | A1* | 11/2015 | Zhou | G06F 11/3409 717/124 |
| 2016/0210723 | A1* | 7/2016 | Yang | G06N 3/00 |
| 2016/0350645 | A1* | 12/2016 | Brothers | G06N 3/0454 |
| 2017/0024849 | A1* | 1/2017 | Liu | G06T 1/20 |

OTHER PUBLICATIONS

Rupp, K., et al., "Pipelined Iterative Solvers with Kernel Fusion for Graphics Processing Units," Dec. 15, 2014, pp. 1-24, vol. 1410. 4054, arVix.org, United States.

Choudary, C., et al., "Stencil-Aware GPU Optimization of Iterative Solvers," SIAM Journal on Scientific Computing, Jul. 2013, 21 pages, United States.

Belter, G., et al., "Automating the Generation of Composed Linear Algebra Kernels," Proceedings of the Conference on High Performance Computing Networking, Storage and Analysis, 2009, 12 pages, ACM, United States.

Muralidharan, S., et al., "Nitro: A Framework for Adaptive Code Variant Tuning," 2014 IEEE 28th International Parallel and Distributed Processing Symposium, 2014, pp. 501-512, IEEE, United States.

Tabik, S., et al., "Performance Evaluation of Kernel Fusion BLAS Routines on the GPU: Iterative Solvers as Case Study," The Journal of Supercomputing, Jan. 23, 2014, pp. 577-587, Springer Science+ Business Media, United States.

Wang, Y., et al., "An Auto-Tuning JIT Compiler for Accelerating Multiple Stencil Computations," International Journal of Computer Engineering and Applications, Feb. 2014, pp. 33-41, vol. V, Issue II, United States.

Filipovic, J., et al., "Optimizing CUDA Code by Kernel Fusion—Application on BLAS," CoRR, Jul. 16, 2013, pp. 1-20, vol. 1305.13, arXiv.org, United States.

Russell, F.P., et al., "DESOLA: an Active Linear Algebra Library using Delayed Evaluation and Runtime Code Generation," Science of Computer Programming, Jul. 1, 2008, pp. 1-33, Elsevier, United States.

Mell, P.M., et al., "The NIST Definition of Cloud Computing", National Institute of Standards and Technology, Sep. 28, 2011. 7 pages, NIST Special Publication 800-145, Maryland, United States.

Meng, J. et al., "Dataflow-Driven GPU Performance Projection for Multi-Kernel Transformations," 2012 International Conference for High Performance Computing, Networking, Storage and Analysis, Nov. 1, 2012, pp. 1-12, iEEE, United States.

List of IBM Patents or Applications Treated as Related.

* cited by examiner

600

610 — Input : CSR matrix X: (values, col$_{idx}$, row$_{aff}$), $m$ (# of rows), $n$ (# of columns), Vector: $p$, $VS$ (# of threads per vector), $C$ (coarseening factor)

620 — output: Vector: $w$

630 —
```
1  begin
2    tid ← thread local ID;
3    (lid, vid) ← (tid % VS, tid / VS); // lane and vector ID
4    NV ← blockSize / VS; // # of vectors per block
5    row ← block_ID × NV + vid;
6    SD[1 : n] ← 0; // on shared memory
```

640 —
```
7    for c ← 1 to C do
8        if (row < m) then
9            start ← row_aff [row]; // current row offset
10           end ← row_aff [row + 1]; // next row offset
11           for (i = start + lid; i < end; i += VS) do
12               SD[column_idx[i]] += values[i] × p[row];
13           row += (gridSize/VS);

14   synchronize(); // wait till all vectors reach here
15   for (i = tid; i < n; i += blockSize) do
16       atomicAdd(w[i], SD[i]);
```
650

710 — Input : CSR matrix X: (values, col$_{idx}$, row$_{aff}$), Vectors: $y$, $v$, and $z$, Scalars: m, n, VS, C, $\alpha$ and $\beta$
720 — output: Vector: $w$ 730
1 begin
2     Initialization // lines 2-6 Algorithm 1
3     for ($i$ = thread global id; $i < n$; $i$+ = gridsize) do
4        atomicAdd($w[i]$, $\beta$ x $z[i]$);

740
5     for $c \leftarrow 1$ to $C$ do
6        if (row $< m$) then
7           start $\leftarrow$ row$_{aff}$ [row]; // current row offset
8           end $\leftarrow$ row$_{aff}$ [row + 1]; // next row offset
9           sum $\leftarrow 0$;
10          for ($i$ = start + $lid$; $i <$ end; $i$+ = $VS$) do
11             sum + = values[$i$] x $y$[col$_{idx}$ [$i$]];

12          sum = intra,vector_reduce(sum) x $v$[row];
13          for ($i$ = start + $lid$; $i <$ end; $i$ + = $VS$) do
14            $SD$[column$_{idx}$[$i$]] + = values[$i$] x sum;

15        row + = (gridSize/$VS$);

750
16     synchronize();//wait till all vectors reach here
17     for ($i$ = $tid$; $i < n$; $i$ + = blockSize) do
18        atomicAdd($w[i]$, $\alpha$ x $SD[i]$);
760

810 — Input : Matrix: $X$, Vectors: $y$, $v$, and $z$. Scalars: $m$, $n$, $VS$, $C$, $a$,
           $\beta$, and $TL$ (load per thread)
820 — output: Vector: $w$ 830 — 1  begin                           ╱— 835
      2     Initialization // lines 2-5 Algorithm 1
840 — 3     $l_w[1:TL] \leftarrow 0$;
      4     for $i \leftarrow 1$ to $TL$ do
      5        $l_y[i] = y[lid + i \times VS]$;

850 — 6     for ($i$ = thread global id; $i < n$; $i$ += gridsize) do
      7        atomicAdd($w[i]$, $\beta \times z[i]$);

860 — 8     for $c \leftarrow 1$ to $C$ do
      9        if (row < $m$) then
      10          sum $\leftarrow$ 0;
      11          for $i \leftarrow 1$ to $TL$ do
      12             $l_X[i] \leftarrow X[\text{row}, i \times VS]$;
      13             sum += $l_X[i] \times l_y[i]$;

14          if ($VS \leq 32$) then
      15             sum = intra_vector_reduce(sum) $\times v[\text{row}]$;

16          else
      17             sum = intra_wrap_reduce(sum);
      18             // wait till all warps reach here
      19             synchronize();
      20             sum = inter_warp_reduce(sum) $\times v[\text{row}]$;
      21             // wait till inter-warp reduction finishes
      22             synchronize();

23          for $i \leftarrow 1$ to $TL$ do
      24             $l_w[i]$ += $l_X[i] \times$ sum;

25       row += (gridSize/$VS$);

870 — 26    for $i \leftarrow 1$ to $TL$ do
      27       atomicAdd($w[lid + i \times VS]$, $a \times l_w[i]$);
                                     880 —

FIG. 8

PIPELINED APPROACH TO FUSED KERNELS FOR OPTIMIZATION OF MACHINE LEARNING WORKLOADS ON GRAPHICAL PROCESSING UNITS

BACKGROUND

There are two broad approaches for performing machine learning (ML) on Graphics Processor Units (GPUs). First, create hand-crafted libraries of implementations in the form of GPU kernels targeting specific algorithms, such as support vector machines, neural networks, and decision trees. Second, implement ML processes by composing or stitching together a sequence of invocations to GPU accelerated primitive operations, such as matrix-vector multiplication. While the first approach lacks flexibility and customization, the latter approach can potentially be very inefficient.

SUMMARY

Embodiments relate to optimization of machine learning (ML) workloads on a graphics processor unit (GPU). In one embodiment, a method includes identifying a computation having a generic pattern commonly observed in ML processes. Hierarchical aggregation spanning a memory hierarchy of the GPU for processing is performed for the identified computation including maintaining partial output vector results in shared memory of the GPU. Hierarchical aggregation for vectors is performed including performing intra-block aggregation for multiple thread blocks of a partial output vector results on GPU global memory.

These and other features, aspects and advantages of the embodiments will become understood with reference to the following description, appended claims and accompanying figures.

BRIEF DESCRIPTION OF THE DRAWINGS

FIG. 6 illustrates a process for a kernel for sparse matrices, according to one embodiment;

FIG. 7 illustrates a process for a fused kernel for sparse matrices, according to an embodiment;

FIG. 8 illustrates a process for a fused kernel for dense matrices, according to an embodiment;

DETAILED DESCRIPTION

Figure 1:
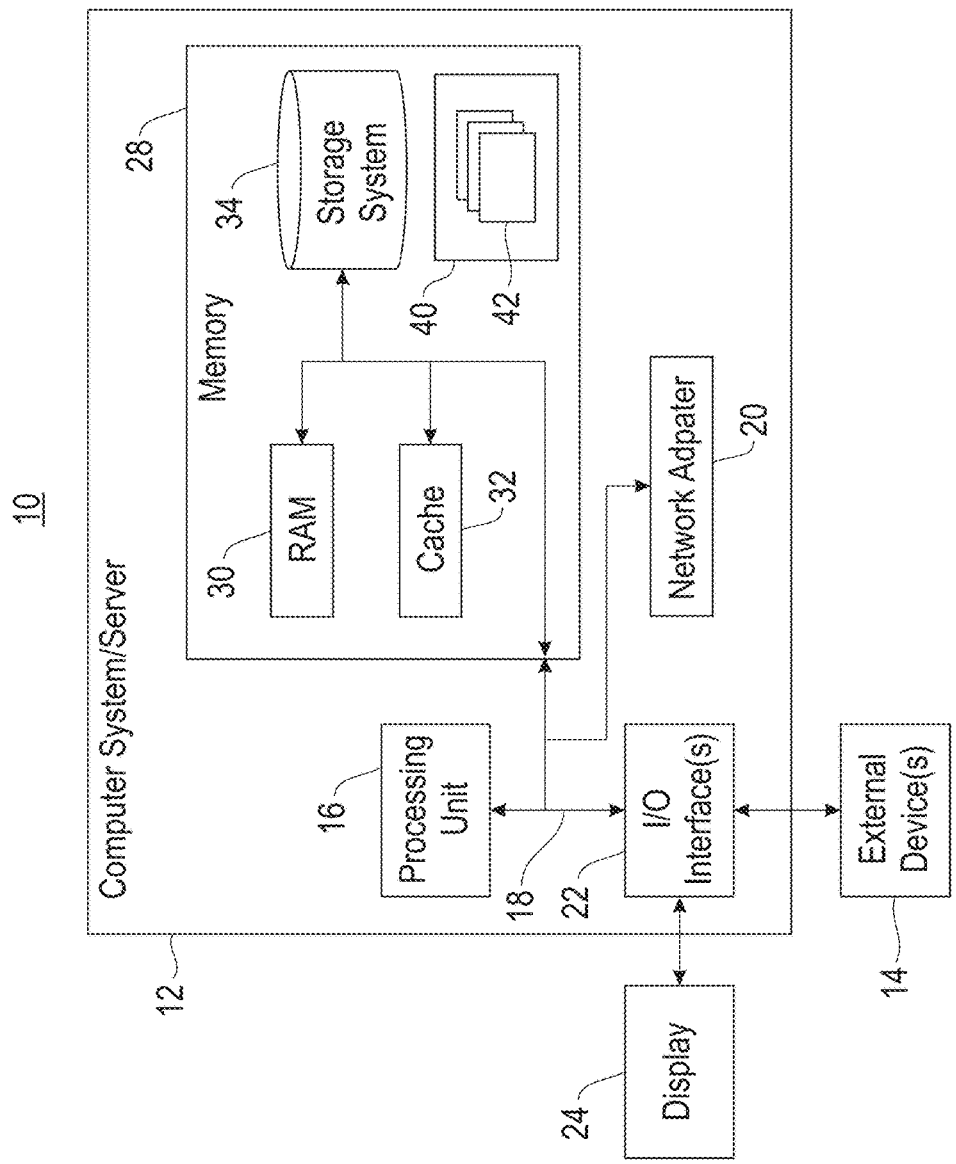
FIG. 1 depicts a cloud computing node, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, the embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of the embodiments described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiments.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of the embodiments as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
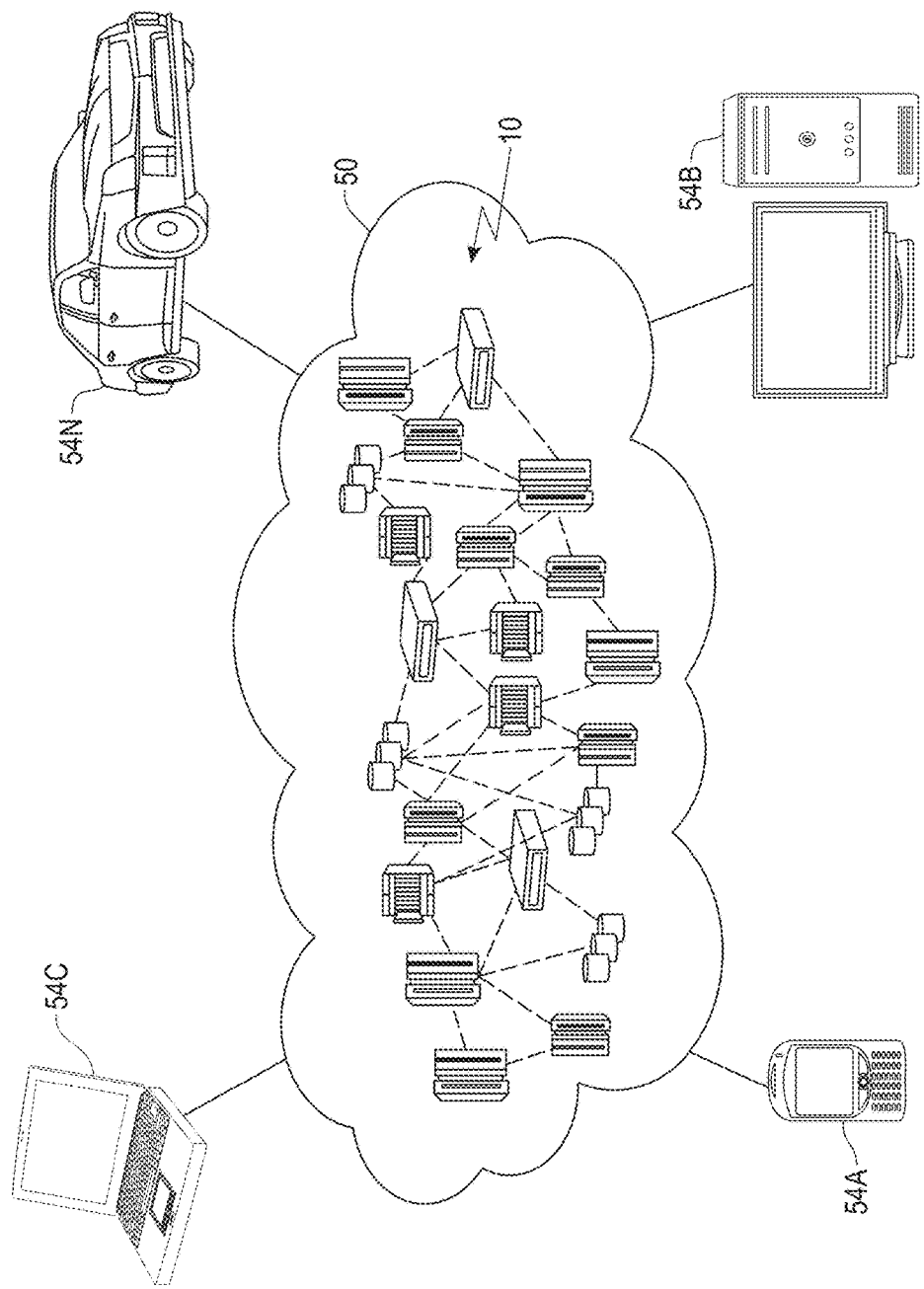
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
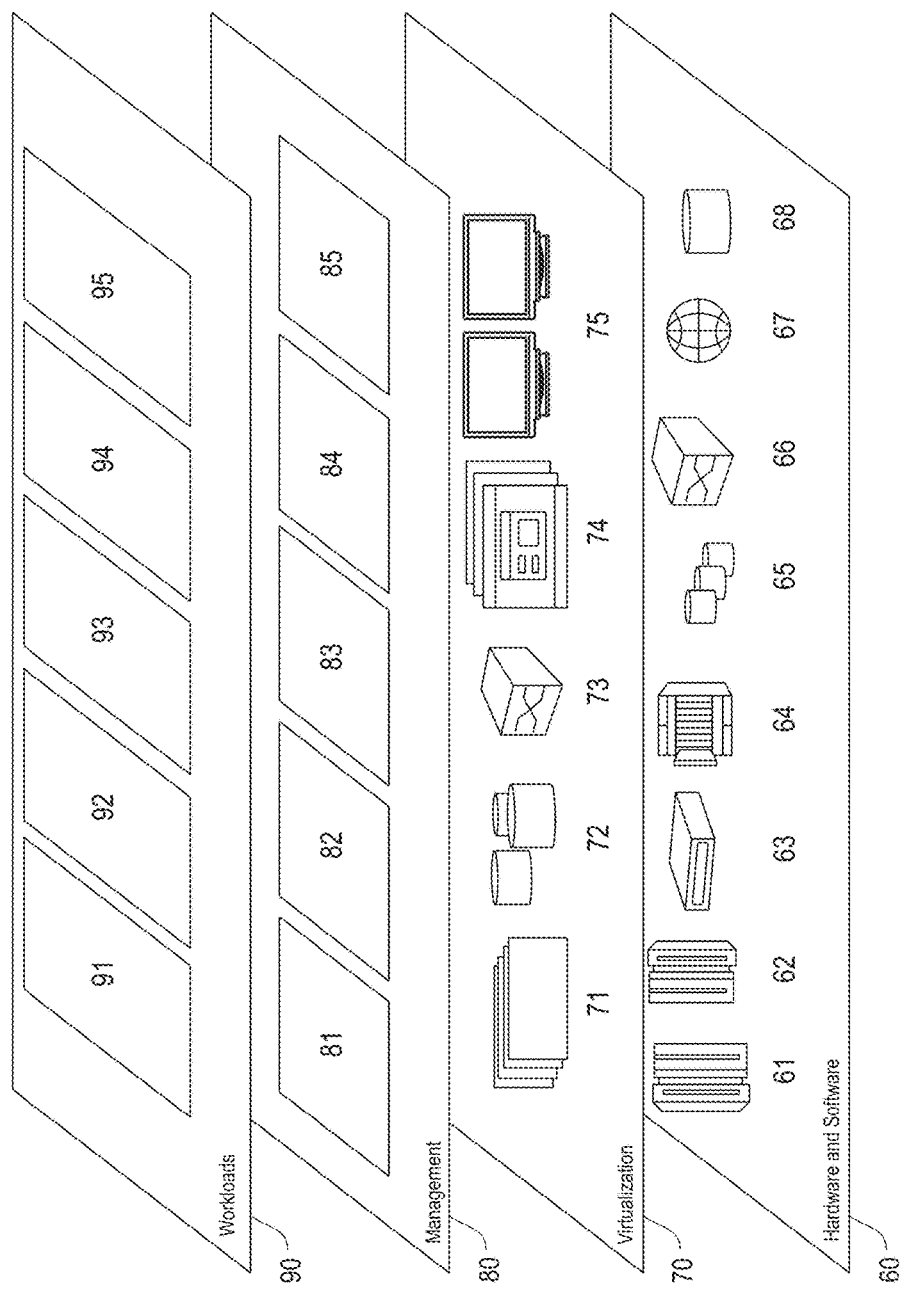
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 3 are illustrative only, and the embodiments are not limited to these examples.

It is understood all functions of one or more embodiments as described herein may be typically performed by the server 12 (FIG. 4), which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments may be implemented with any type of clustered computing environment now known or later developed.

Embodiments relate to optimizing machine learning (ML) workloads on graphical processing units (GPUs) using pipelined approach to fused kernels. One embodiment provided is a method for optimization of ML workloads for a GPU that includes identifying a computation having a generic pattern commonly observed in ML processes. An optimized fused GPU kernel is employed to exploit temporal locality for inherent data-flow dependencies in the identified computation. Hierarchical aggregation spanning a memory hierarchy of the GPU for processing for the identified computation is performed. GPU kernel launch parameters are estimated following an analytical model that maximizes thread occupancy and minimizes atomic writes to GPU global memory.

One or more embodiments provide processing to efficiently execute a pattern of computation that may commonly be observed in many ML processes. One or more embodiments may include: a pipelined approach is employed that exploits temporal locality to deal with inherent data-flow dependencies in the computation; a hierarchical aggregation strategy that spans GPU memory hierarchy, which reduces the synchronization overhead by performing as much local aggregations as possible; an analytical model to determine near-optimal settings for kernel launch parameters that maximizes thread occupancy and minimizes atomic writes to global memory, and incurs minimal computation overhead; and in the case of dense input matrices, a particular code generation technique that relies on underlying hardware configuration, specific computations, and the input data characteristics to generate an efficient GPU kernel code that performs a majority of computations on GPU registers.

In one or more embodiments, development of GPU kernels for primitive linear algebraic operators (e.g., matrix-vector multiplication) that are used in developing ML processes is extended by developing fused kernels for a combination of primitive operators that may be found in popular ML processes or algorithms. In one embodiment, a generic pattern of computation:

$$w=(\alpha * X^T \times (v \odot (X \times y)) + \beta * z) \quad (1)$$

and its various instantiations are identified, where $\alpha$ and $\beta$ are scalars, w, y, and z are vectors, and X is a matrix that may be either sparse or dense. The symbol $\odot$ denotes element-wise multiplication, and $\times$ represents matrix multiplication. In one example embodiment, a fused kernel is developed to optimize the $(\alpha * X^T \times (v \odot (X \times y)) + \beta * z)$ computation on GPUs—with specialized processing and techniques to handle both sparse and dense matrices. The approach of the one or more embodiments not only reduces the processing cost of data loads due to improved temporal locality but also enables other optimizations, such as coarsening and hierarchical aggregation of partial results. In one embodiment, an analytical model that considers input data characteristics and available GPU resources is implemented to estimate near-optimal settings for kernel launch parameters. The one or more embodiments provide speedups, for example, ranging from 2× to 67× for different instances of the generic pattern compared to launching multiple operator-level kernels using GPU accelerated libraries.

Table 1 shows example instantiations of the generic pattern from Equation 1, and their presence in ML algorithms.

TABLE 1

| Pattern Instantiation | LR | GLM | LogReg | SVM | HITS |
|---|---|---|---|---|---|
| $\alpha * X^T \times y$ | ✓ | ✓ | ✓ | ✓ | ✓ |
| $X^T \times (X \times y)$ | ✓ | ✓ | | ✓ | ✓ |
| $X^T \times (v \odot (X \times y))$ | | ✓ | ✓ | | |
| $X^T \times (X \times y) + \beta * z$ | ✓ | | | ✓ | |
| $X^T \times (v \odot (X \times y)) + \beta * z$ | | | ✓ | | |

Developing an efficient Compute Unified Device Architecture (CUDA) kernel for the identified pattern is challenging due to multiple reasons. First, for the general pattern, the input matrix X needs to be accessed both in row-major (for X×y) and column-major (for $X^T \times (\cdot)$) order with the same underlying representation, storing X in both formats is inefficient. Second, inherent data-flow dependencies within the computation impede parallelism—for example, $X^T \times (\cdot)$ can be evaluated only after computing $(v \odot (X \times y))$. Third, it is non-trivial to realize an efficient result aggregation strategy that incurs minimal synchronization overhead, especially in the presence of a CUDA complex threading model with threads, warps, and blocks. Fourth, ensuring a balanced workload, maximizing thread occupancy, and realizing coalesced memory accesses in case of sparse matrices with different number of non-zeros across rows is difficult.

Figure 4:
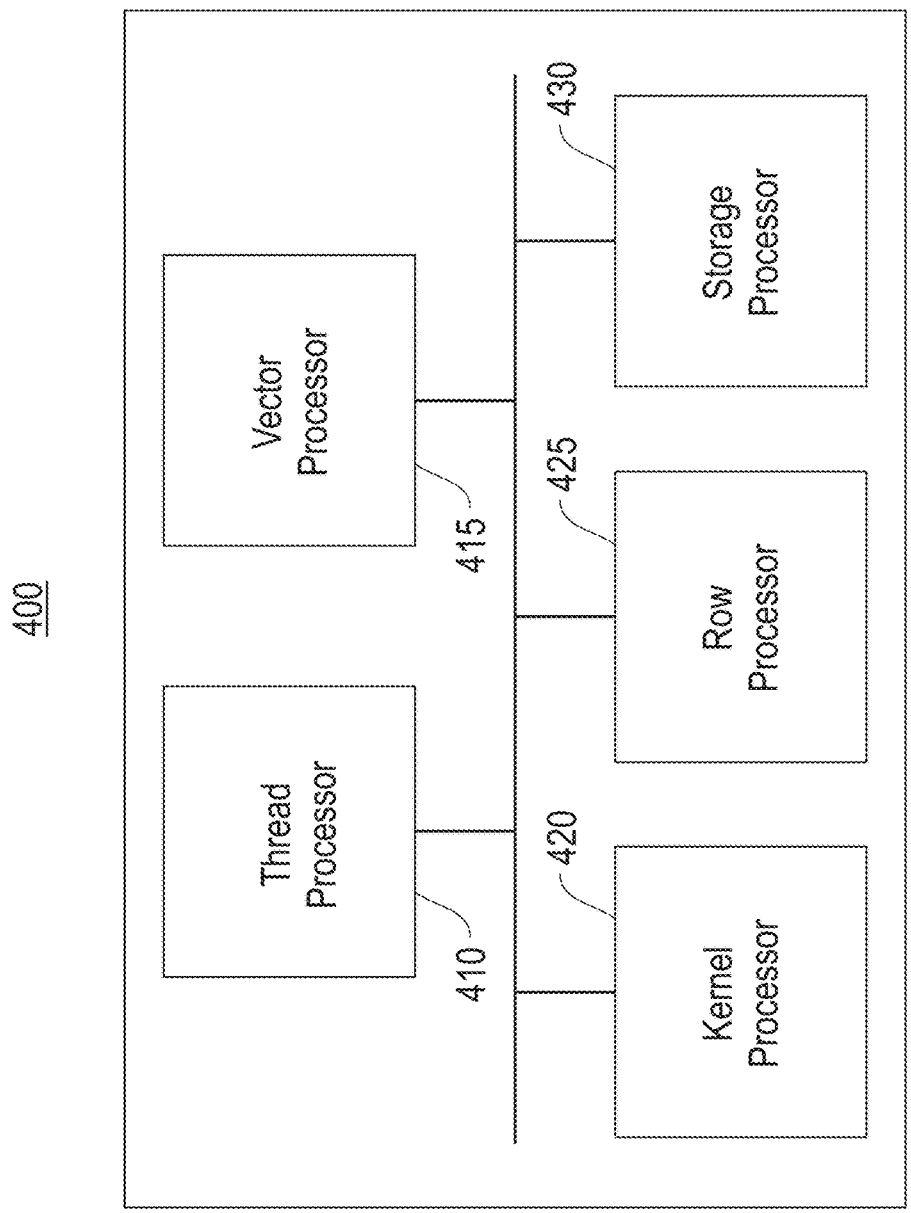
FIG. 4 is a block diagram illustrating a system for GPU optimization of ML workloads, according to an embodiment.

FIG. 4 is a block diagram illustrating a system 400 (e.g., a GPU) for GPU optimization of ML workloads processing, according to an embodiment. In one embodiment, the system 400 includes a thread processor 410, a vector processor 415, a kernel processor 420, a row processor 425 and a storage processor 430. In one embodiment, the thread processor 410 is configured to receive an input matrix comprising a matrix (sparse or dense) that includes row and column data, and to partition the GPU threads into blocks of threads that include thread vectors, where a vector includes sets of cooperating threads for processing the input matrix (see, FIG. 15). In one embodiment, a block of GPU threads is partitioned into the number of vectors in a block (NV) as NV sets (or vectors) of cooperating threads. Each set (or vector) includes vector size (VS) threads, and it is responsible for processing a coarsening factor (C) (out of the total m) rows in the input matrix. Furthermore, threads in each set (or vector) simultaneously operate on every one of C rows, in parallel. In one example, this is accomplished in such a way that the result of one operator is immediately fed into the next operator. Such a data parallel processing with a chain of operators eliminates the need for synchronization among sets, and alleviates the problems posed by dataflow dependencies.

In one embodiment, the row processor 425 is configured to operate with the vector processor. In one example, the row processor is configured to process multiple threads in a vector on a same row of the input matrix simultaneously to determine partial output vector results. In one embodiment, the storage processor 430 is configured to maintain the partial output vector results in shared memory of the system 400. In one example embodiment, the storage processor 430 includes storage processing for registers, shared memory, and global memory of the system 400. In one embodiment the kernel processor 420 is configured to perform inter-vector or intra-block aggregations for the vectors via atomic operations using the partial output vector results. In one embodiment, the vector processor is configured to perform inter-block aggregation for multiple thread blocks of the partial output vector results on global memory for reducing atomic writes to the global memory and to provide final output vector results.

In one embodiment, the system 400 provides a fused kernel to deal with inherent data-flow dependencies in the input matrix processing. In one embodiment, an optimized fused kernel that exploits temporal locality to reduce the number of loads while scanning the input is provided. The system 400 provides a hierarchical aggregation strategy spanning the complete GPU memory hierarchy (registers, shared memory, and global memory) that performs as many local aggregations as possible to reduce the synchronization overhead. An effective analytical model is used to estimate kernel launch parameters that maximizes thread occupancy, minimizes atomic writes to global memory, and estimates near-optimal settings with minimal overhead. In one embodiment, for the case of dense input matrices, the kernel processor 430 provides a code generation technique that relies on unrolling to perform a majority of computations on GPU registers. In one example, unrolling may include each thread scaling elements of an input vector, aggregating the scaled elements into a local register (using the storage processor 430) as a partial result of the output vector, and once all assigned rows are processed (by the row processor 425), threads within each vector propagate their partial results in the local register to the global memory of the GPU (using the storage processor 430).

The identified pattern from equation (1), along with its variants may be commonly found in a variety of ML processes or algorithms, and they also account for a significant fraction of processing (e.g., computer processing unit (CPU) compute time). A direct approach for GPU exploitation is to launch separate kernels for individual operations. For example, $(X^T \times (X \times y))$ can be computed by invoking two basic linear algebra subprograms (BLAS) Level 2 functions—one for matrix-vector multiplication ($X \times y$) and another for transpose-matrix-vector multiplication ($X^T \times (\cdot)$). Such an approach is inefficient, especially because matrix-vector multiplication is memory-bound. Consider an NVIDIA® GeForce GTX Titan with 1.2 TFLOPs peak double precision performance. The bandwidth to global memory is 288 GB/sec (ECC off). Peak performance can only be achieved when every data load is used in at least 34 floating point operations. However in the case of matrix-vector multiplication, every element read from X is used exactly once, i.e., 1 compute/load. Therefore, launching multiple kernels for such memory-bound computations will result in low performance.

Moreover, the computation of $(X^T \times (\cdot))$ is typically more expensive (computationally) than $X \times y$. For sparse matrices, this is due to uncoalesced memory accesses caused by the mismatch in the access pattern (column-major) and the underlying storage layout (row-major, for compressed sparse row (CSR) representation). In the case of dense matrices, blocks of X can be read and kept in shared memory for future access. Although the reads from global memory can be coalesced due to regular indexing, the accesses to shared memory may cause memory bank conflicts, resulting in poor performance.

In one embodiment, system 400 addresses the above-mentioned shortcomings of the naïve approach by implementing a fused kernel, where the data is propagated through a chain of operators without explicitly storing the intermediate results in global memory. In one embodiment, system 400 alleviates the problem of repeated data loads in memory-bound workloads by exploiting temporal locality. Consider $(X^T \times (X \times y))$, where X is sparse. Each row r of X is still loaded twice, once to compute p[r]:

$$p[r] = v[r] \times (X[r,:] \times y[:]), \quad (2)$$

and once again to compute the partial result of w:

$$w[:] = X[r,:] \times p[r] \quad (3)$$

In one embodiment, however, if it is ensured that the second load of X [r,:] (to compute w) is performed by the same threads that previously used the row for computing p, due to temporal locality the second load will likely be a cache hit. This decreases the overhead due to loads potentially by a factor of up to 2. Such a behavior can be guaranteed when the number of non-zeros per row is bounded by the cache size. Finally, in system 400 the partial values of w computed by multiple threads spanning warps and blocks are aggregated to obtain the final vector result.

In one example, it is assumed that the input matrix X fits in the system 400 device memory. This allows amortization of the cost of data transfer between the host and the device across multiple iterations of an ML process or algorithm (see, e.g., Listing 1). In situations where such an amortization is not feasible, one or more embodiments may be adapted to a streaming design for "out-of-core" computation.

Figure 5:
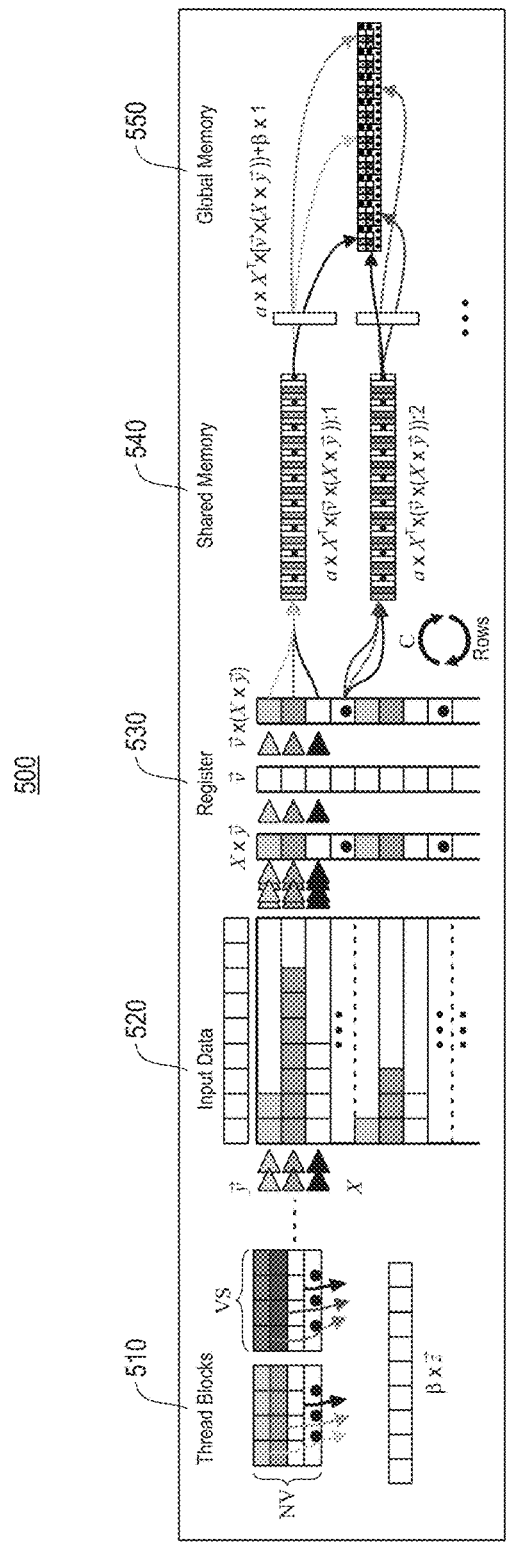
FIG. 5 illustrates a processing storage/retrieval flow for a fused kernel sparse matrix, according to one embodiment.

FIG. 5 illustrates a processing storage/retrieval flow 500 for a fused kernel sparse matrix, according to one embodiment. In one example, the different storage usage and processing blocks include thread block processing 510, input data 520, register usage 530, shared memory usage 540 and global memory usage 550. The flow 500 represents the flow for a fused kernel for a sparse matrix with VS, NV, and C. For ease of discussion, the notation is shown below in Table 2.

TABLE 2

| Symbol | Description |
| --- | --- |
| m | Number of rows in X |
| n | Number of columns in X |
| VS | Vector Size, Number of threads within a vector |
| NV | Number of vectors within a block |
| BS | Block Size, Number of threads within a block |
| C | Degree of coarsening, Number of rows processed by vectors |
| TL | Thread load |

FIG. 6 illustrates a process 600 for a kernel for sparse matrices, according to one embodiment. In one embodiment, the input 610 includes a matrix X (e.g., a CSR matrix). The matrix X includes values, $col_{idx}$, $row_{off}$, m (# of rows), and n (# of columns). A Vector includes: p, VS (# of threads per vector), and a C (coarsening factor). The output 620 of process 600 is Vector w. Process 600 begins on line 1 630 and completes with an atomic Add function 650 at line 16. The entire processing to compute $X^T \times p$ is summarized in process 600. Beginning on line 7 640 through line 13, the first processing segment is performed. Lines 15-16 perform the second processing segment. In one embodiment, process 600 is performed using system 400 (FIG. 4).

In one example, assume that the number of columns n in X is small, so that the partial result of the vector w may be kept in shared memory. It should be noted that this assumption is removed below in one or more embodiments. The basic component of equation (1) is X T×p. Although entities may offer an application programming interface (API) for this specific operation (e.g., NVIDIA CUDA Sparse Matrix library (cuSPARSE)), it is very slow when compared to X×p. NVIDIA even suggests an explicit transposition of the matrix (e.g., using the csr2csc API), followed by a standard sparse matrix-vector multiplication. This suggestion, however, is inefficient due to the high processing cost in transposing the matrix, and the need to maintain both X and $X^T$ on the device. Note that both X and $X^T$ are required for the computation processing. In one or more embodiments, $w = X^T \times p$ is processed in two processing segments: 1) intra-block computation and aggregation processing, and 2) inter-block aggregation processing.

In one embodiment, for the first processing portion of process 600, the idea of CSR-vector is leveraged, and a block of threads is partitioned into sets of cooperating threads referred to as vectors. The number of threads in a vector is denoted as vector size VS. The number of vectors within a single block is denoted NV. In one embodiment, all threads in a vector work on the same row r simultaneously to compute partial results $w[:] = w[:] + X[r,:]T \times p[r]$. A given vector of threads is responsible for processing a total of C rows, which is referred to as the degree of coarsening. The number of rows in X is denoted by m and the number of columns is denoted as n (see Table 2 above for the complete notation). In one embodiment, process 600 for processing a kernel for sparse matrices is provided with segment numbers on the left for ease of discussion.

In the case of a sparse matrix, different rows may have different numbers of non-zeros leading to highly irregular accesses and write conflicts over w while computing the partial results. When VS is smaller than the number of non-zeros in a row, a single thread within a vector itself may produce results for multiple elements in w. In one embodiment, each element in w may get updated simultaneously by threads from different vectors operating on different rows. Handling such write conflicts requires a careful strategy for aggregation. In one example, a simple choice is to let threads maintain a local version of the entire vector w in the system registers. This however is redundant and inefficient use of registers. Observe that the partial results produced from an input row span different elements in w, i.e., there is no need for intra-vector aggregation on w, and therefore w may be shared among all threads within a vector. Partial results produced by multiple vectors across all blocks must be aggregated on the global memory using atomic operations. Since such atomic accesses are slow, an additional level of pre-aggregation among vectors within a single block is performed by process 600. To facilitate this, w is maintained in shared memory (that is on the SM), and process 600 performs inter-vector or intra-block aggregations via atomic operations.

In the second processing portion in process 600 for computing $X^T \times p$, the final inter-block aggregation is performed on the system global memory. Since multiple thread blocks may write to the same element of w, in one embodiment this access is atomic. To reduce synchronization overhead, in one embodiment the degree of coarsening C is increased and the block size is increased to their maximum possible values, while achieving the maximum possible occupancy. Further details parameter tuning is described below. The synchronization in Line 14 ensures that all vectors within a block are finished with processing before the results are used in the final aggregation.

FIG. 7 illustrates a process 700 for a fused kernel for sparse matrices, according to an embodiment. In one embodiment, the input 710 includes a matrix X (e.g., a CSR matrix). The matrix X includes values, $col_{idx}$, $row_{off}$, m (# of rows), and n (# of columns). Vectors include: y, v, and z. Scalars include: m, n, VS, C, α and β. The output 720 of process 700 is Vector w. Process 700 begins on line 1 730 and completes with an atomic Add function 760 at Line 18. The entire processing to compute $X^T \times p$ is summarized in process 700. Beginning on Line 2, the initialization is processed (similar to lines 2-6 of process 600, FIG. 6). The complete fused kernel is shown in process 700. In one embodiment, the for loop in Lines 3-4 takes care of β*z and the loop in Line 5 740 through Line 15 performs the rest of the processing. For each row, threads compute partial results of p[r] in Lines 10-12, performs register-level intra-vector aggregation and computes p[r]*v[r] in Line 12. Subsequently, the partial result of w is computed on the shared memory of the system (e.g., system 400 (FIG. 4)) in Lines 13-14 (shared memory usage 540, FIG. 5). The synchronization in Line 16 marks the completion of inter-vector aggregation (shown as bars between shared memory usage 540 and global memory usage 550, FIG. 5). Aggregation on the global memory to yield the final result is performed in Line 17 750 through Line 18.

In one embodiment, an important aspect concerns the atomic Adds in Line 4 during the scalar computation with β. While it may be easily be parallelized across thread blocks without atomic operations, it requires inter-block barrier synchronization to ensure that the subsequent computation starts only after β*z is fully computed. Otherwise, it may lead to race conditions. For example, CUDA does not provide support for such inter-block barriers to allow for flexibility in scheduling thread blocks. The two alternatives here are either to use atomic adds as shown in Line 4 or to launch two kernels, one for computing β*z and the other for rest of the computation.

In one embodiment, the process 700 may be extended to a larger computation process: $w = X^T \times (X \times y)$. Each row in X must now be accessed twice to perform two matrix-vector multiplications. In one embodiment, the goal behind the technique is to reuse the rows r while computing w[:]=X[r,:]T×p[r], where p[r]=X[r,:]×y[:]. The data is first loaded during the computation of p[r]. It can be seen from the computation processing that the dot product X[r,:]×y[:] produces the final value of a single scalar p[r]. Subsequently, elements of X[r,:] are scaled by p[r] to calculate partial results w[:]. In one embodiment, $X^T \times (X \times y)$ is computed in three processing segments: intra-vector computation and aggregation, intervector aggregation, and inter-block aggregation. The last two segments are similar to process 600 (FIG. 6). In the first segment processing, the dot product p[r]=X[r,:]×y[:] is computed by leveraging the ideas of a CSR-vector and segmented reduction. Note that this processing segment introduces an additional level of aggregation, i.e., at the register-level. Threads within a vector compute the partial results of p[r] in registers, which are subsequently aggregated using a shuffle instruction available, for example, on NVIDIA Kepler architectures. Such a hierarchical strategy of aggregation spans registers (intra-vector), shared memory (inter-vector), and global memory (inter-block). In one embodiment, this processing may be further extended by performing the element-wise vector-vector multiplication, as in $w = X^T \times (v \odot (X \times y))$. As soon as the value of p[r] is computed by a vector of threads, one of those threads performs the element-wise multiplication v[r]*p[r]. Finally, with respect to the complete pattern, the computation β*z may be considered as an initialization step that is performed in the beginning, by all threads.

In one embodiment, process 700 is limited by the amount of available shared memory per SM on the system (e.g., a GPU system, system 400, FIG. 4). Since the inter-vector aggregation is performed using the shared memory, the number of columns n in X must be small so that w fits in the shared memory. In one example, the exact limit on n may be computed from two parameters VS and NV, as described below. In one example, for a device with 48 KB shared memory per SM, the limit on n is close to 6K. Such matrices with limited number of columns may be common in many enterprise workloads.

In one embodiment, the processing may be extended to handle matrices with large number of columns as well (e.g., below a comparison is made using a data set that has 30M columns). In one embodiment, for such large data sets the inter-vector aggregation is moved from shared memory to global memory. The for loop in Lines 13-14 then operates on global memory using atomic operations. Note that the inter-block aggregation in Lines 17-18 is no longer required. This modified strategy increases the synchronization overhead, especially when n is relatively small, due to large number of concurrent writes. However, as the shared memory limit gets mitigated, there can be as many active threads as the maximum number of concurrent threads on each SM. For example, 64 active warps (2,048 threads) per SM with compute capability ≥3.5. By dynamically switching between warps when threads are stalled due to memory access, such an access latency can be hidden. Furthermore, when n is very large, the data is likely to be sparse (e.g., social network data) and the likelihood of concurrent accesses to a single element of w is very small, which reduces the overhead due to atomic writes.

FIG. 8 illustrates a process 800 for a fused kernel for dense matrices, according to an embodiment. In one embodiment, the input 810 includes a matrix X (e.g., a CSR matrix). Vectors include: y, v, and z. Scalars include: m, n, VS, C, α and β, and TL (load per thread). The output 820 of process 800 is Vector w. Process 800 begins on line 1 830 and completes with an atomic Add function 880 at Line 27. Beginning on line 2, the initialization is processed (similar to lines 2-5 of process 600 (FIG. 6). In one embodiment, process 800 for handling dense matrices is similar to process 700 (FIG. 7). Unlike the case of sparse matrices, in one embodiment indexing is leveraged since data accesses on dense data are very regular. In one example, the local memory available on SMs (i.e., registers) is used to obtain higher access speeds than shared memory. However, the bank conflict rate increases by the order of the number of warps in a block, since the number of shared memory banks on each SM is limited (e.g., 32 in NVIDIA Kepler GPUs). In one embodiment, intra-vector coarsening is more explicit and constant among rows, while it is implicit and row-dependent in the case of sparse data. Further, each vector of threads processes C rows, a second level of coarsening.

In one embodiment, process 800 performs processing for the case of dense matrices. Each row is processed by VS threads, where each thread processes TL elements of the row. Variables ly, lx, and lw in process 800 refer to registers local to threads. In the first segment processing, the elements of y are read by each vector once, and maintained in registers ly (Line 4 840 to Line 5). Additionally, w is initialized with β*z in Line 6 850 to Line 7. In one embodiment, for each row r, threads within the vector perform the following: read TL elements of X; multiply by the corresponding element of y; and compute the partial result of X[r,:]×y[:] (Lines 11-13 within the for loop starting at Line 8 860). These partial results are then aggregated in Lines 14-22. If VS≤32, reduction is performed in a single action by all threads of the vector (Lines 14-15). Otherwise, it includes two actions: an intra-warp reduction using registers via the shuffle instruction (similar to intra-vector reduction) in Line 19 followed by inter-warp reduction in Line 20. Appropriate synchronizations are performed to avoid any race conditions. The cell-wise multiplication between p[r] and v[r], is again performed by a single thread (Lines 15 and 20). Each thread then scales the elements of X[r,:] by v[r]×(X[r,:]×y[:]) (Lines 23-24), and aggregates them into a local register lw—a partial result of w. Once all assigned rows are processed, threads within each vector propagate their partial results in lw to global memory (Line 26 870 to Line 27).

It should be noted that elements of X, y and the partial results of w are maintained in registers, lx, ly and lw, respectively. Accesses to these registers are done via indexing. However, if the index value is unknown at compile time, CUDA forces these accesses to use global memory instead of registers, which significantly degrades the performance. To deal with this problem, in one embodiment code generation is employed. Since the matrix dimensions and input parameters are known at the time of invoking an ML process, in one embodiment a code generator is used to produce the kernel that uses explicit registers and performs loop-unrolling for Lines 4 840 to Line 5, Lines 11-13, 23-24, and Line 26 870 to Line 27 in process 800. Listing 1 below shows an example of generated kernel mtmvm, for producing α*$X^T$×(v⊙(X×y)) when the inputs are: a dense matrix X of size m×32; VS=16; and TL=2. Line 17 in Listing 1 below corresponds to Line 4 840 to Line 5 in process 800, in which the for loop has been unrolled. In one embodiment, instead of register indexing, registers are accessed directly via explicit names, such as ly1 and ly2. Note that the loop unrolling factor is equal to the thread load TL. This parameter may be chosen depending upon the number of available registers.

In process 800, in one example it is assumed that the number of columns n is a multiple of the vector size VS. This assumption is made to avoid thread divergence inside a vector (and a warp, accordingly). When n % VS=0, both matrix X and vector y are padded with zero rows. In the worst case, only VS is padded—1 row—hence, the cost of padding is negligible. In one embodiment, this is performed prior to launching the kernel.

Listing 1.

```
1   __global__ void mtmvm_32_16_2(const, double *X,
                const double *y, const double *v, const a,
                double *w) {
2       __shared__ volatile double sdata [16];
3       unsigned int tid = threadIdx.x;
4       unsigned int lid = tid & (15);
5       unsigned int vid = tid / 16;
6       unsigned int rowStart = blockIdx.x * NV + vid;
7       unsigned int rowEnd = rowStart + (gridDim.x + NV)
                * rowPerVector;
8       double sum, l_y1, l_y2, l_X1, l_w1, l_w2;
9       if (tid < 16)
10          sdata [tid] = 0
11      if (rowStart < rowDim) {
12          if (rowEnd > rowDim)
13              rowEnd = rowDim;
14          rowStart = rowStart *colDim + lid;
15          rowEnd = rowEnd *colDim + lid;
16          l_w1 = l_w2 = 0.0f;
17          l_y1 = y[lid]; l_y2 = y[lid + 16];
18          for (; rowStart < rowEnd; rowStart += (gridDim.x
                    *NV) * COLdIM) {
19              l_X1 = X[rowStart]; sum = l_X1 * l_y1;
20              l_X2 = X[rowStart +16]; sum += l_X2 *
                    l_y2;
21              sum = interVectorReduce(sum);
22              if (lid == 0)
23                  sdata [vid] = sum * v[rowStart/colDim];
24              sum = sdata[vid];
25              l_w1 += l_X1 * sum; l_w2 += l_X2 * sum;
26          }
27          r = r + lid;
28          atomicAdd(r, a * l_w1);
29          atomicAdd(r + 16, a * l_w2);
30      }
31  }
```

In one embodiment, the number of registers available on a GPU governs the maximum number of columns that may be handled by process 800. In one example, for a NVIDIA Kepler device with 64K registers per SM, the limit on n is close to 6K. In order to process matrices with large n, all aggregations from registers are moved to global memory. Since the matrix X is dense, the number of concurrent writes to global memory is likely to be very high, which leads to serialization of writes. In such a scenario, in one embodiment the fused kernel is not used, and instead, two separate cuBLAS Level 2 kernels are launched. It should be noted that, in practice, it is not very common to encounter such dense data sets with large number of columns.

In one embodiment, input parameters of kernels have to be tuned appropriately, in order to realize the best performance. In one embodiment, analytical models are employed to determine the best configurations for these parameters; by considering both input matrix characteristics, and available re-source limits on the underlying GPU. For parameters for a Sparse Kernel: the main parameters are: VS; BS; and C. Other parameters such as NV, or grid size, may be determined accordingly. VS determines number of cooperating threads that work on the same row(s) together. As the idea of segmented reduction and CSR-Vector are leveraged in the kernel, a simple strategy is used to determine VS. Let μ denote the average number of non-zero elements per row in a sparse matrix with a total number NNZ of non-zeros elements, i.e., μ=NNZ/m. Then, VS is chosen from the set $\{2^0, 2^5\}$ as follows:

$$VS = \begin{cases} 32 & \text{if } \mu > 32 \\ 2^i & \text{if } 2^{i+1} \geq \mu \geq 2^i, i \in \lceil 1, 4 \rceil \\ 1 & \text{otherwise} \end{cases} \quad (4)$$

As the computation for Equation 4 is memory-bound, BS is determined in such a way that it maximizes the occupancy on the GPU. For this purpose, the following limits of the device are considered:
Available register and shared memory per SM
Maximum number of threads per block, and per SM
Maximum number of active blocks
Register and shared memory allocation granularity
Maximum number of registers per thread
Register and shared memory allocation units.

For GPUs with compute capability ≥3.5, these limits are—(64K 32 bit-registers and 48 KB), (1,024 and 2,048), (8 blocks), (256 registers and 4 warps—per thread block), (256), and (256 and 256 Bytes), respectively. In one example embodiment, a kernel requires 43 registers per thread (e.g., determined via NVIDIA Visual Profiler]), and (BS/VS+n)× size of (precision) shared memory. For different values of BS from $\{1 \times 32, \ldots, 32 \times 32\}$, the number of concurrent warps is calculated, considering the number of registers and shared memory required. In one embodiment, the exact value of BS is chosen to maximize the number of concurrent blocks, NW. To set the coarsening factor C, in one embodiment the goal is to reduce the number of atomic write accesses to global memory. In one example, C is set so that all warps have maximal balanced workload, i.e., $$C = \left\lceil \frac{M}{NSM \times \frac{NW}{VS}} \right\rceil \quad (5)$$

where N SM is the number of available SM s on the GPU.

In the case of a dense kernel, C is set similarly as above. However, in one embodiment, TL and BS are first determined—VS can be set accordingly. Here, registers are heavily used, and to minimize the waste of register allocation BS is set to a size that is a multiple of the register allocation granularity; $\{1 \times 128, \ldots, 8 \times 128\}$. Further, to minimize the overhead of inter-vector synchronization, BS is set to the minimum possible value; i.e. BS=128. For setting TL, the dense kernel is profiled with different values of TL, and the number of registers required in each case is recorded. In one embodiment, a kernel requires 23 registers with TL=1 and can handle up to TL=40 (requiring 255 registers). Since register spilling severely degrades the performance with TL>40, TL∈$\{1, \ldots, 40\}$ is only considered. Having this information and GPU resource limits, the number of concurrent warps NW may be calculated. Further, a refinement is performed to exclude the number of warp loads that are wasted by each vector. For example, with BS=128, TL=2 and n=200, there is 1 wasted warp $\lfloor 2 \times 128-200 \rfloor$. While with TL=7, there is no wasted warp per vector; $\lfloor 7 \times 32-200 \rfloor$. After setting TL based on the maximum number of concurrent warps, excluding wasted warps per vector, VS is set as:

$$VS = \begin{cases} BS & \text{if } \frac{n}{TL} > 32 \\ 2^i & \text{if } 2^i \geq \frac{n}{TL} > 2^{i-1}, i \in \lceil 1, 5 \rceil \\ 1 & \text{otherwise} \end{cases} \quad (6)$$

In one example, there is one exception: when the number of columns is less than the warp size, n≤32, BS is set as BS=1024 and TL is set as TL=1. In such a case, since the system is not limited by the synchronization overhead, the maximum possible thread block size may be used. Further, each thread only loads a single element of a row from the matrix, and hence, the use of a large number of threads helps in hiding the latency during data loads.

The performance of proposed techniques and processing using a combination of synthetic and real-world data sets is empirically evaluated. For this purpose, a NVIDIA GeForce GTX Titan with 6 GB global memory, a compute capability 3.5, and CUDA driver version 6.0 is employed. In one example, the device is attached via PCIe-Gen3 (32 GB/s) to a host with Intel core-i7 3.4 GHz CPU, 16 GB memory, and 4 cores (8 hyper-threads). The performance of the some embodiments are compared against a baseline approach of using GPU accelerated NVIDIA libraries (cuBLAS and cuSPARSE) to compute various instances of the generic pattern in Equation 1. Other libraries (e.g., BIDMat) are also considered in the evaluations. BIDMat is an interactive matrix library that integrates CPU and GPU acceleration. BIDMat uses Intel MKL for CPU acceleration and implements specialized kernels for GPU acceleration.

Figure 9:
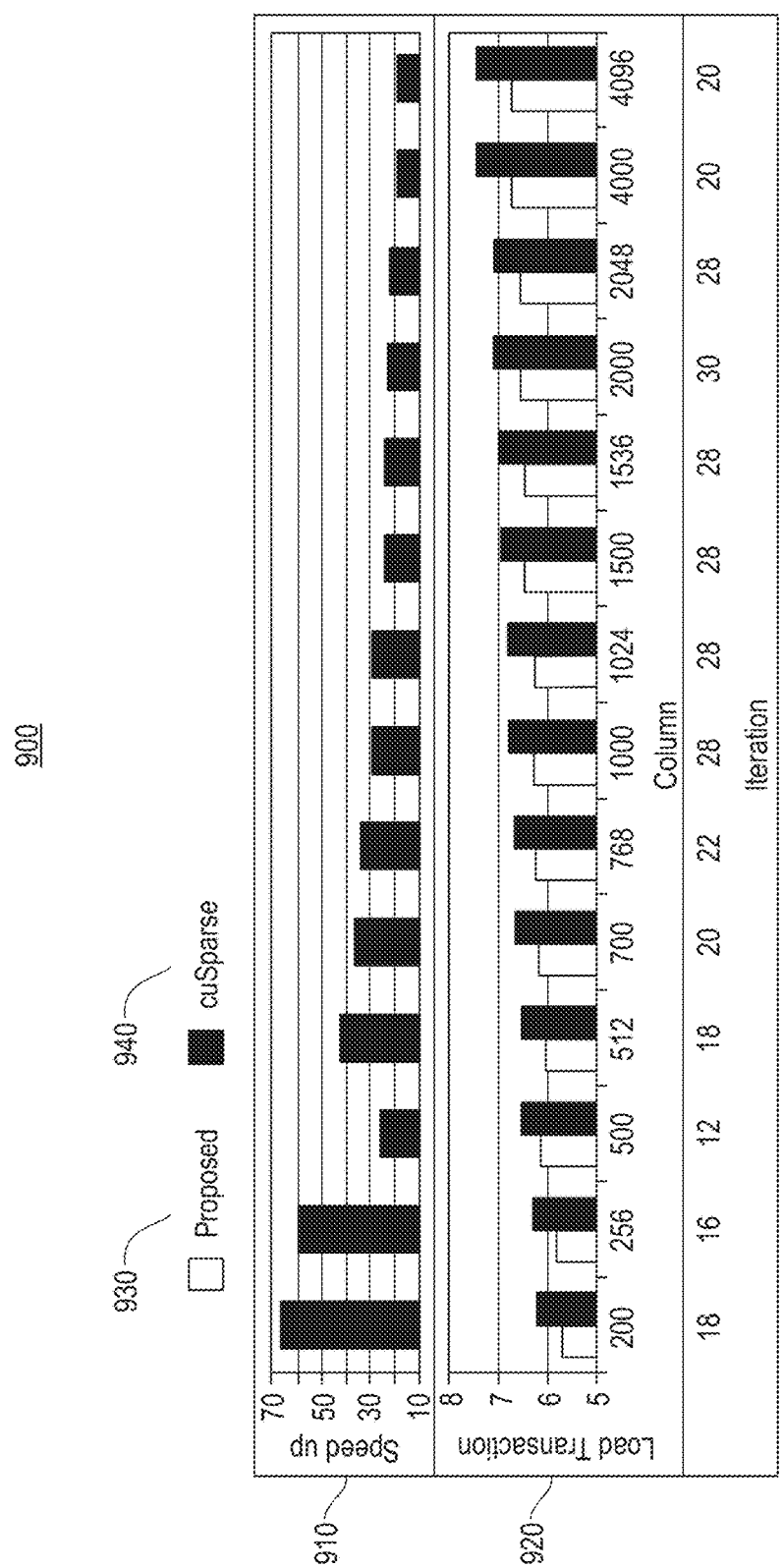
FIG. 9 illustrates a comparison of performance for an embodiment versus the NVIDIA® Compute Unified Device Architecture (CUDA) Sparse Matrix library, according to an embodiment.

FIG. 9 illustrates a chart 900 including performance for an embodiment, and the performance versus the NVIDIA CUDA Sparse Matrix library (cuSPARSE), according to an embodiment. The embodiment kernel is represented as reference 930 indicates, and the cuSPARSE is represented as reference 940. In one example, a randomly generated synthetic data set with number of rows in X set to 500 k and vary the number of columns from 200 to 4,096. The sparsity is set to 0.01. For the pattern $X^T xy$, the observed speedups from the above-described embodiments are shown in the top of the chart 900 at reference 910. On average, the kernel of an embodiment is roughly 35× faster than cuSPARSE, with highest speedups up to 67× in the lower end of the spectrum. The performance differences are primarily due to a difference in the number of global load transactions, as shown on the bottom of chart 900 at reference 920; note that y-axis is shown in log scale. The embodiment kernel consistently performs a less number of loads when compared to cuS-PARSE across the board, on average, cuSPARSE performs 3.5× more loads. This may be due to explicit construction of $X^T$ and the use of semaphores (e.g., cuSPARSE is not open source). The performance of BIDMat is similar to cuS-PARSE. Further, the performance of a kernel embodiment is driven by the fact that data accesses are always performed in a coalesced manner, and the input vector y is always bound to texture memory, which improves accesses over y. By measuring the time to explicitly construct $X^T$ and then to compute $X^T xy$, the number of iterations in ML processes required to amortize the transpose time into matrix-vector product computation is determined as shown in the second X axis in chart 900. A high number of iterations in chart 900 indicate that explicitly constructing the transpose is an inefficient approach when dealing with sparse matrices.

Figure 10:
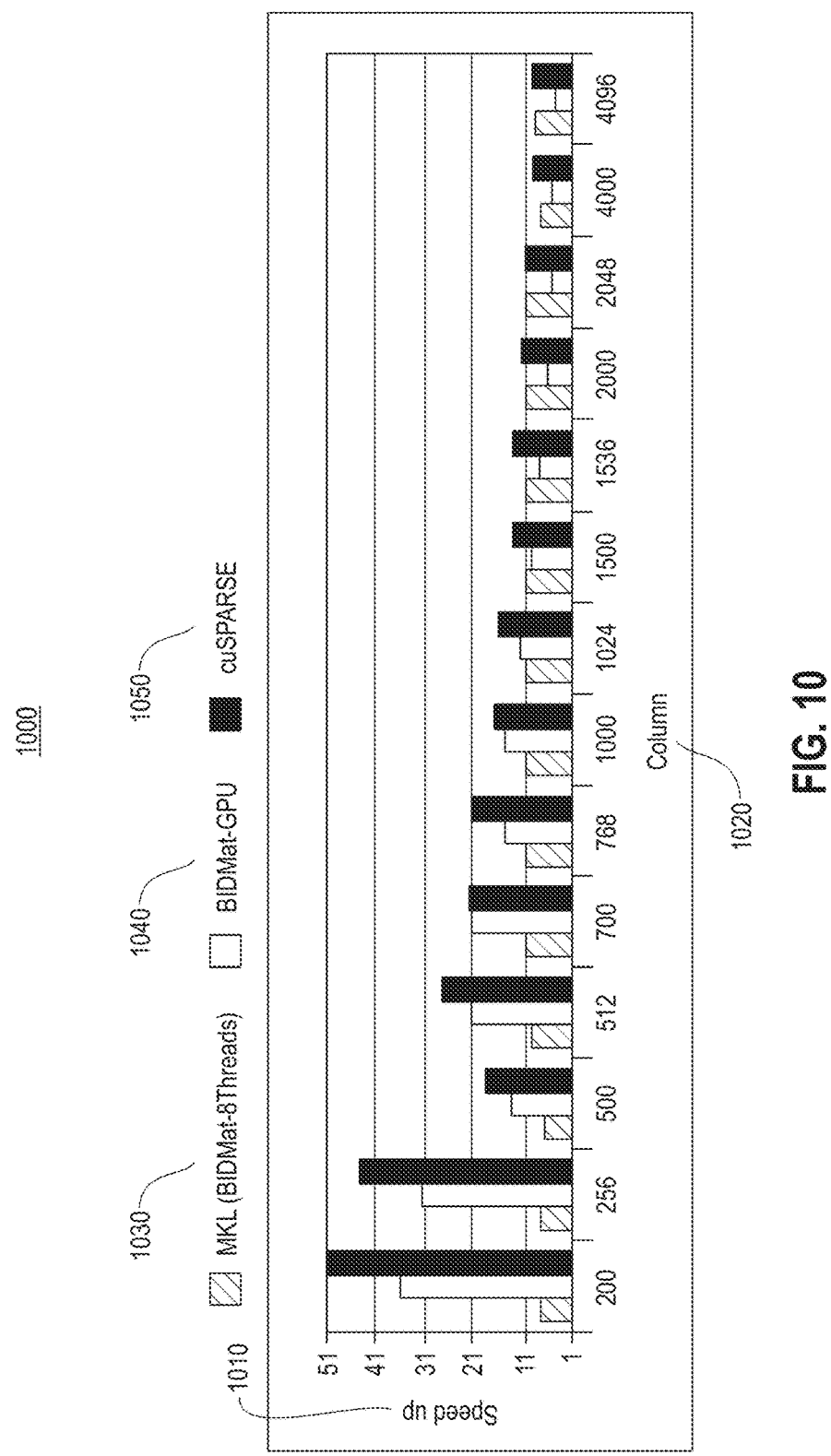
FIG. 10 illustrates a speedup comparison for a kernel, according to an embodiment.

FIG. 10 illustrates a speedup comparison chart 1000 for a kernel, according to an embodiment. For the pattern $X^T \times (X \times y)$, observed speedups for the synthetic data are shown in chart 1000. The Y axis shows speed up 1010, and the X axis shows columns 1020. The benefits from the fused kernel embodiment (e.g., process 700) are evident from the chart 1000; and it outperforms the alternative processes for all matrix sizes. The average speedup is observed to be 9.28×, 14.66×, and 20.33×, against BIDMat-CPU (MKL with 8 hyper threads, reference 1030), BIDMat-GPU (reference 1040), and cuSPARSE (reference 1050), respectively. These speedups are primarily due to improved data accesses via temporal locality; avoidance of materializing intermediate results through fused kernels; and finally, hierarchical aggregation strategy spanning registers, shared memory, and global memory.

Figure 11:
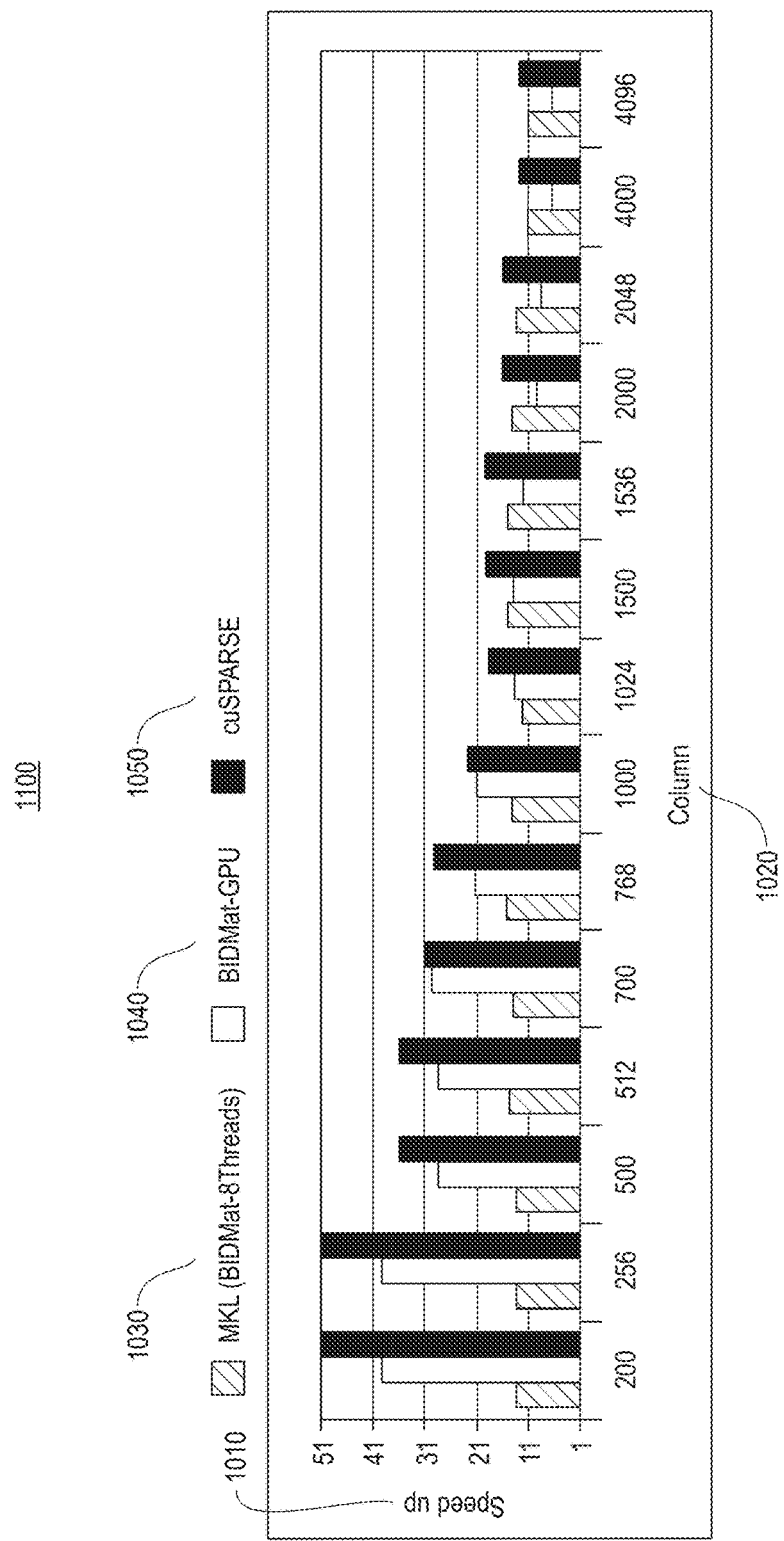
FIG. 11 illustrates another speedup comparison for a kernel, according to an embodiment.

FIG. 11 illustrates another speedup comparison chart 1100 for a kernel, according to an embodiment. Chart 1100 shows the achieved speedups of an example embodiment kernel in computing the complete pattern $\alpha * X^T \times (v \lfloor (X \times y)) + \beta * z$. Since the whole computation is bottlenecked by $X^T \times (X \times y)$, the performance differences are expected to be similar or slightly better than those in chart 1000 (FIG. 10). On average, speedup is observed to be up to 13.41×, 19.62×, and 26.21× against BIDMat-CPU 1030 (MKL with 8 hyper threads), BIDMat-GPU 1040, and cuBLAS/cuSPARSE 1050, respectively. Note that, cuBLAS is used here to perform (Level 1) vector-vector computations.

When the number of columns in the input matrix is very large, all intra-block aggregations are moved from shared memory to global memory, according to an embodiment. To measure the impact of such a choice, an ultra-sparse real-world data set is considered: KDD2010 with 15,009,374 rows, 29,890,095 columns, and 423,865,484 non-zeros. Table 3 below shows the execution time of an embodiment against a method using cuSPARSE/cuBLAS libraries—the numbers shown are in milliseconds. The example embodiment can efficiently handle data sets with large n as well, with more than two orders of magnitude improvement in case of $X^T \times y$, and a 66-fold speedup when computing the full pattern. When n is very large, the data set is likely to be sparse, leading to a reduced number of concurrent access to a single element of w on global memory. Therefore, the impact of concurrent atomic writes to global memory is also likely to be low.

TABLE 3

| Pattern | Proposed | cuSPARSE/cuBLAS |
|---|---|---|
| $X^T \times y$ | 50.5 | 5552.1 |
| $X^T \times (X \times y)$ | 78.3 | 5683.1 |
| $\alpha * X^T \times (v \odot (X \times y)) + \beta * z$ | 85.2 | 5704.1 |

Figure 12:
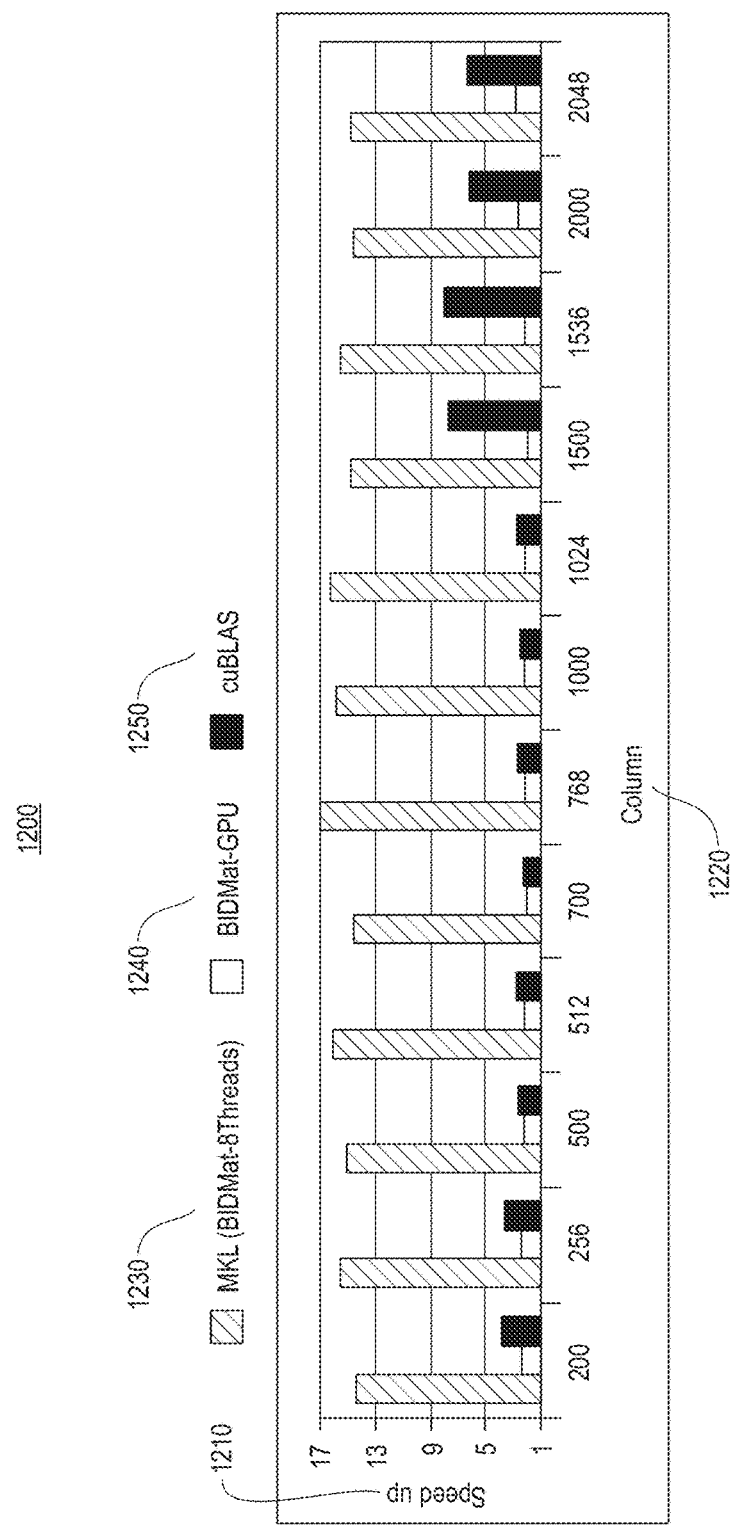
FIG. 12 illustrates another speedup comparison for a kernel, according to an embodiment.

FIG. 12 illustrates another speedup comparison chart 1200 for a kernel, according to an embodiment. A similar evaluation is shown in chart 1200 to evaluate a dense fused kernel embodiment. Chart 1200 shows that the embodiment fused kernel outperforms all the competing processes on dense matrices. The X axis 1210 for chart 1200 shows speed up, and the Y axis 1220 shows the number of columns. Reference 1230 represents BIDMat-CPU (MKL with 8 hyperthreads), reference 1240 represents BIDMat-GPU, and reference 1250 represents cuBLAS. On average, the observed speedups are 15.33×, 2.18×, and 4.27× over BID-Mat-CPU 1230 (MKL with 8 hyperthreads), BIDMat-GPU 1240, and cuBLAS 1250. In general, it is expected that the fused kernel for dense matrices embodiment does not reach the same level of improvement as observed on sparse matrices. This is consistent with the performance differences observed between $X \times y$ and $X^T \times y$ on dense and sparse matrices using cuBLAS/cuSPARSE, indicating that most of the gain achieved by kernel embodiments comes from loading X only once. Moreover, as the chart 1200 shows, MKL (CPU) works better on sparse matrices compared to BIDMach-GPU and cuSPARSE, while it performs worse on dense matrices since regular accesses brings more improvements on the GPU side. In chart 1200, matrices are used with the number of columns up to 2K. For m>2K, the matrix does not fit in device memory anymore. As described above, code generation is performed in the case of dense matrices. In the generated kernel embodiment, computational loops are unrolled, and X and y are loaded to registers once, and used as often as required. Listing 1 shows an example embodiment for a generated kernel. It should be noted that the time spent in code generation is negligible when compared to the actual computation time. It should also be noted that the performance of the kernel embodiment on the full pattern is similar to that shown in chart 1200, since the majority of time while computing the full pattern is spent in $X^T \times (X \times y)$.

Figure 13:
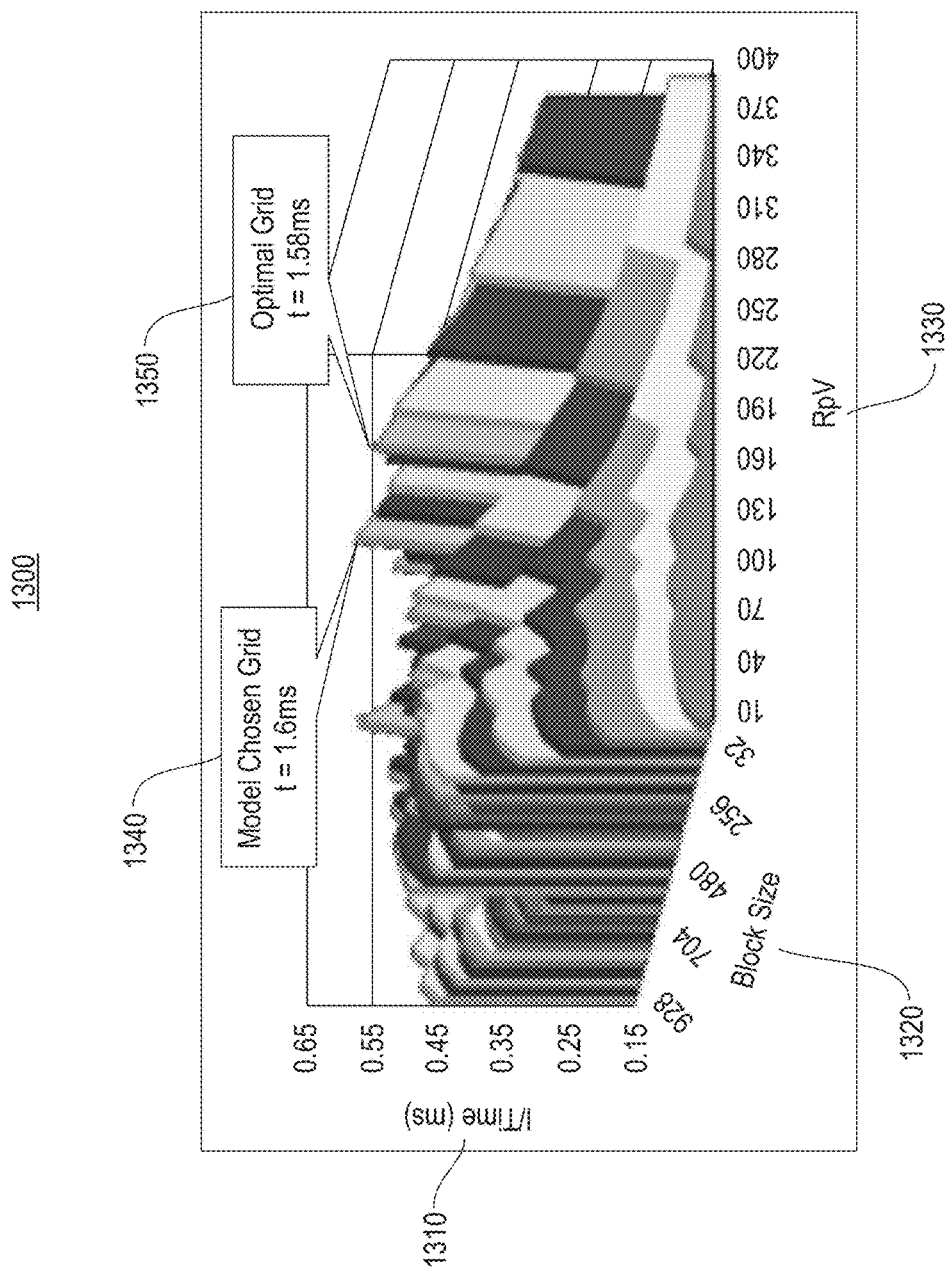
FIG. 13 illustrates a 3-D graph of a search space for different settings for a kernel, according to an embodiment.

FIG. 13 illustrates a 3-D graph 1300 of a search space for different settings for a kernel, according to an embodiment. One or more embodiments have a goal to maximize occupancy while moving the overhead of atomic accesses from global memory to shared memory and to registers, as much as possible. The model incurs minimal performance overhead, since the parameter exploration is done in a limited search space. VS is chosen based on Equations 4 and 6, while the block size is selected from the set $\{2^5, 2^{10}\}$. The number of rows handled by a set of cooperating threads (vector) is set to possible numbers around what the model selects; grid size is also chosen accordingly. The entire search space, on average, consists of about 1,200 different settings (see graph 1300). Note that y axis 1310 is shown as 1/Time, so that the peaks with small time are clearly visible. The z axis 1320 is shown as block size and the x axis 1330 is shown as the number of rows that is processed by each vector (RpV). For a sparse matrix of size 500 k×1 k, the chart 1300 shows that the performance difference in computing $X^T \times (X \times y)$ using the optimal setting and the configuration chosen by an embodiment model is less than 2%. This difference is also less than 0.1% of the performance difference between the best and the worst settings. Further, the configuration chosen by the embodiment model is one of the best 1% settings in terms of execution time. Reference 1340 shows a model chosen grid and reference 1350 shows an optimal grid.

In one example embodiment, the sparse kernel requires 43 registers per thread, selects VS=8, BS=640, and uses (BS/VS+n)×sizeof (precision)=8,832B shared memory per thread block. It then sets number of blocks to 28, where each vector takes care of 223 rows of the matrix. For a dense kernel, the thread load TL may range from 1 (requiring 24 registers) to 40 (requiring 255 registers). Using TL larger than 40 results in register spilling and poor performance. VS is set so that each thread handles a maximum of 40 elements in a row. Corresponding 40-way unrolling in the computational loop of the kernel is handled by the code generator.

In one example, the end-to-end performance achieved by an embodiment kernel in executing an entire machine learning process is evaluated. Linear regression is considered, shown in Listing 2 below. Two real-world data sets are used—KDD2010 (sparse) as well as HIGGS (dense). The HIGGS data set is a dense matrix with 11,000,000 rows, 28 columns, and 283,685,620 non-zeros. A GPU accelerated linear regression process is implemented by stitching together a list of CUDA kernel invocations. Here, two versions are used: one with purely cuBLAS/cuSPARSE kernels (denoted cu-end2end), and the other with invocations to our fused kernel (ours-end2end). Since data transfer between the host and the device is limited by PCIe bus, it can be a potential bottleneck for large data sets. Therefore, the time spent in data transfer is accounted for to measure the ultimate benefits from the example embodiment.

Listing 2.

```
1    V = read ($1) ; y = read ($2) ;
2    eps = 0.001; tolerance = 0.000001 ;
3    r = -(t( V ) %* % y) ; # cuBLAS/cuSPARSE: gemv/csrmv
4    p = -r;
5    nr2 = sum (r *r) ; # cuBLAS : nrm2
6    nr2__init = nr2 ; nr2 _ target = nr2 * tolerance ^ 2;
7    w = matrix (0, rows = ncol (V) , cols = 1) ;
8    max__iteration = 100; i = 0;
9    while (i < max__iteration & nr2 > nr2__target) {
10       q = ( (t(V)%*% (V %*% p)) + eps * p);
11       # . . . csrmv/gemv & axpy
12       alpha = nr2 / (t(p) %*% q); # . . . dot
13       w = w + alpha * p; # . . . axpy
14       old__nr2 = nr2;
15       r = r + alpha * q; # . . . axpy
16       nr2 = sum ( r * r) ; # . . . nrm2
17       beta = nr2 / old__nr2;
18       p = -r + beta * p ; # . . . axpy & scal
19       i = i + 1;
20    }
21    write ( w, "w");
```

Table 4 shows the speedups achieved by ours-end2end against cu-end2end. The time to transfer KDD data set from host to device is observed to be 939 milliseconds. This time is amortized over ML iterations. Table 4 also shows the number of iterations executed on both data sets. Overall, the example embodiment achieves up to 9× end-to-end speedup when compared to the baseline strategy. This result demonstrates that the example embodiment not only improves the performance of individual patterns of computation but also provides significant speedup for the entire processing.

TABLE 4

| Data Set | HIGGS | KDD 2010 |
| --- | --- | --- |
| Total Speed Up | 4.8 | 9 |
| Number of ML iterations | 32 | 100 |

In one embodiment, the fused kernel may be integrated into a system for large-scale ML. In one embodiment, the integration includes three main components—(i) a cost model that assists in scheduling operations between the host and the device; (ii) a GPU memory manager that monitors the data transfer activities; and (iii) backend GPU kernels and application programming interfaces (APIs). In one example, the memory manager component is designed to perform the following tasks—a) allocate memory if it is not already allocated on the device; b) if there is not enough memory available on the device, perform necessary evictions to make room for incoming data; c) deallocate unnecessary variables/data and mark them for later reuse; d) maintain consistency between the copies of data maintained on CPU and GPU through appropriate synchronizations; and e) perform necessary data transformations to account for the differences in the data structures used on CPU and GPU. In one example embodiment, the large-scale ML system represents a sparse matrix as an array of sparse rows on a CPU, whereas the same matrix is represented in CSR format on the device. Further, in one example, the large-scale ML system is implemented in Java. Therefore, the processing first has to transfer data from JAVA® virtual machine (JVM) heap space into native space via JAVA® native interface (JNI), before it can be copied to the device. Such data transformations and JNI data transfers can potentially impact the performance. The cost model and the memory manager must be designed in such a way that the impact is minimized as much as possible. With an example cost model and memory manager, observed end-to-end speedups from Java including all the above mentioned overheads are shown in Table 5 below. It is important to note that the overall speedup from the fused kernel alone is more than 10× in the case of HIGGS data set and 4× in the case of KDD2010 data set. Reduced end-to-end speedups when compared to the ones in Table 4 point to further improvement for the memory manager and data transformations.

TABLE 5

| Data Set | HIGGS | KDD 2010 |
| --- | --- | --- |
| Total Speedup | 1.2X | 1.9X |
| Fused Kernel Speedup | 11.2X | 4.1X |
| Number of ML iterations | 32 | 100 |

GPUs provide massive parallelism for compute intensive work-loads. Exploitation of GPUs are used by one or more embodiments to accelerate a wide range of ML processes or algorithms, such as regression and SVMs. By analyzing the characteristics of various ML processes or algorithms, it is observed that they share the common compute pattern $\alpha * X^T \times (v \odot (X \times y)) + \beta * z$ that manifests itself in various instantiations. Computing the pattern using primitive kernels in existing GPU libraries dominates the compute time of these processes or algorithms. One or more embodiments provide generic, fused GPU kernels that are optimized for different data characteristics. The fused kernels minimize data transfer, optimize coarsening, and minimize synchronization during aggregation of partial results.

The fused kernels embodiments provide speedups ranging from 2× to 67× for different instances of the generic pattern compared to running existing kernels. In the context of larger computations, although parts of the computation may be performed on GPUs, it may not always be beneficial given the overhead of data transfer, and GPU memory limitations. One or more embodiments include development of a cost model that is based on a complete system profile that decides on hybrid executions involving CPUs and GPUs. A comprehensive system also factors in data format conversions and GPU memory management including data replacement strategies in the face of iterative computations.

Figure 14:
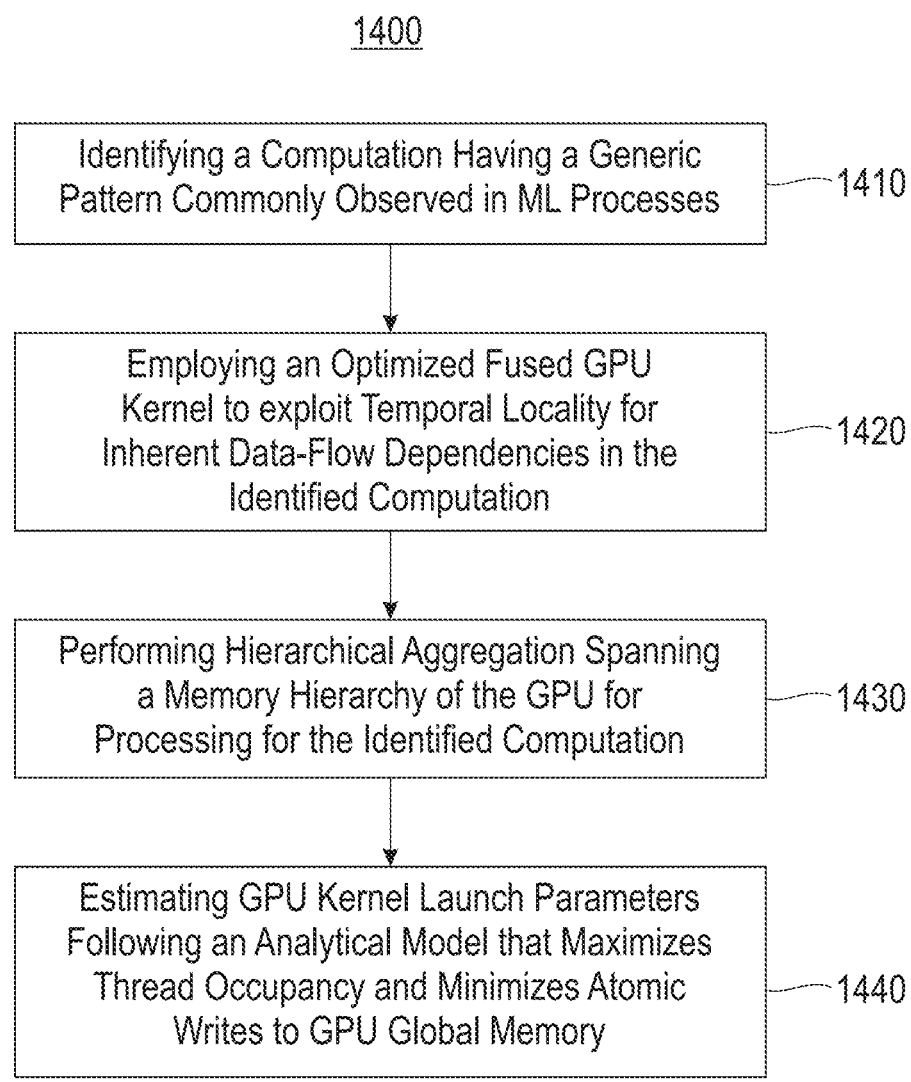
FIG. 14 is a block diagram of a process for GPU optimization of ML workloads, according to an embodiment.

FIG. 14 is a block diagram of a process 1400 for optimization of ML workloads on a GPU, according to an embodiment. In one embodiment, in block 1410 a computation having a generic pattern commonly observed in ML processes is identified. In block 1420 an optimized fused GPU kernel is employed to exploit temporal locality for inherent data-flow dependencies in the identified computation. In block 1430 hierarchical aggregation is performed spanning a memory hierarchy of the GPU for processing for the identified computation. In block 1440 GPU kernel launch parameters are estimated following an analytical model that maximizes thread occupancy and minimizes atomic writes to GPU global memory.

In one embodiment, in process 1400 the generic pattern including multiple linear algebraic operators. In one embodiment, in process 1400 performing hierarchical aggregation includes performing local aggregations when possible for reducing vector synchronization overhead.

In one embodiment, process 1400 may include receiving an input matrix (e.g., matrix X, FIG. 6, FIG. 7, and FIG. 8) comprising a sparse or dense matrix of row and column data. Process 1400 may further include partitioning a block of threads (e.g., by a thread processor 410, FIG. 4, FIG. 15), into vectors including sets of cooperating threads for processing the input matrix. Processing in process 1400 may further provide for processing multiple threads in each vector on a same row of the input matrix simultaneously to determine partial output vector results. In one embodiment, performing hierarchical aggregation comprises maintaining the partial output vector results in shared memory of the GPU and performing inter-vector aggregation or intra-block aggregation for the vectors via atomic operation, and performing inter-block aggregation for multiple thread blocks of the partial output vector results is performed on global memory of the GPU for reducing atomic writes to the global memory and providing final output vector results.

In one embodiment, process 1400 may further include synchronizing the vectors by determining that processing of all vectors within a block is finished before results are used in performing the inter-block aggregation for the multiple thread blocks of the vectors. In one embodiment, the intra-block aggregations for the vectors reduces synchronization overhead, and the sparse matrix comprises a CSR matrix. In one embodiment, process 1400 may further include performing an intra-vector aggregation at a register level of the GPU such that threads within a vector compute the partial output vector results in GPU registers, which are subsequently aggregated using a shuffle instruction.

In one embodiment, a vector of threads is responsible for processing a total of C rows, where C refers to a degree of coarsening. In one embodiment, for the input matrix comprising a dense matrix, performing a code generation technique that relies on unrolling to perform a majority of computations on GPU registers. In one example embodiment, unrolling comprises each thread scaling elements of the input vector, and aggregating the scaled elements into a local register as a partial result of the output vector, and once all assigned rows are processed, threads within each vector propagate their partial results in the local register to the global memory of the GPU.

Figure 15:
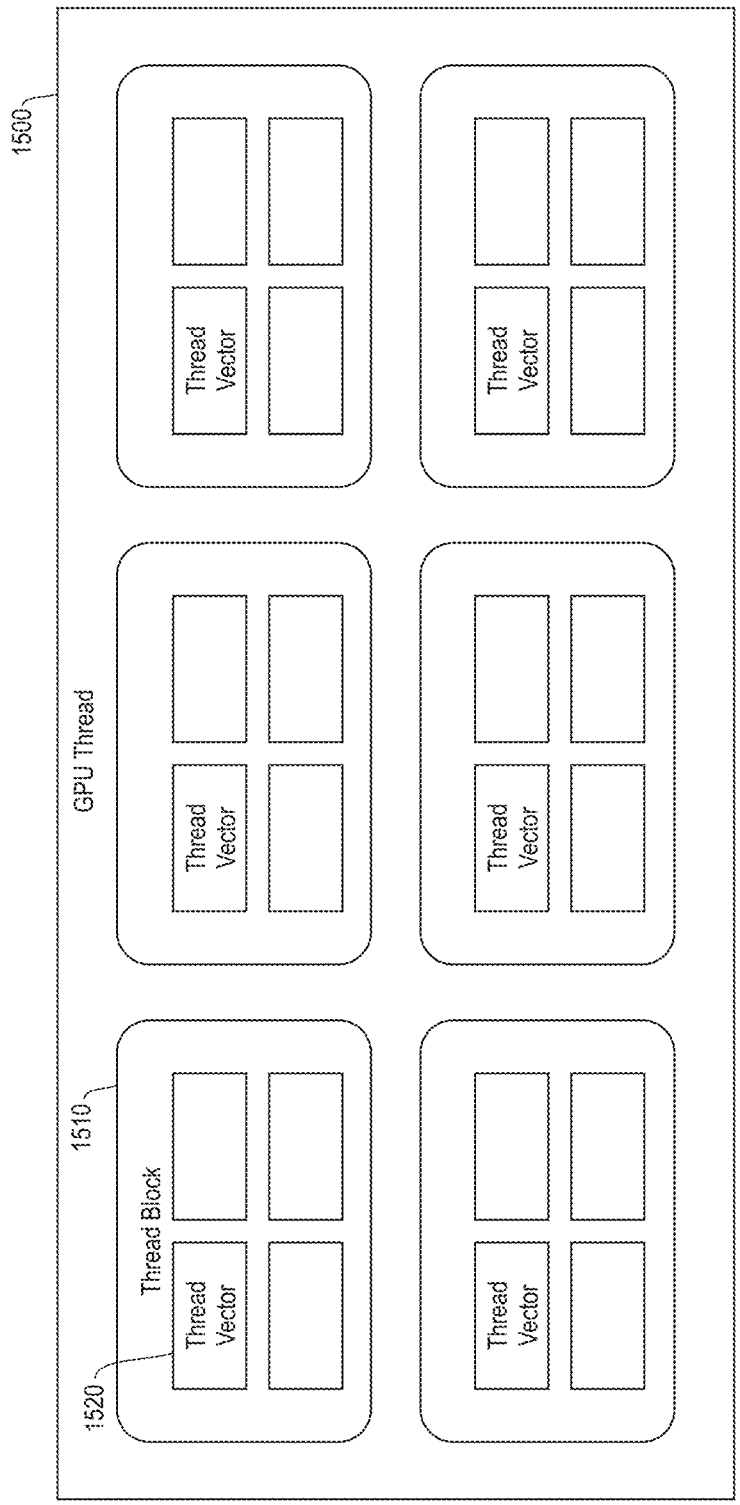
FIG. 15 shows a block diagram for partitioning GPU threads, according to one embodiment.

FIG. 15 shows a block diagram for showing partitioning of GPU threads, according to one embodiment. In one embodiment, GPU threads 1500 are partitioned into multiple thread blocks 1510 that include multiple thread vectors 1520. In one embodiment, hierarchical partitioning of GPU threads 1500 enables multiple hierarchical aggregation strategies. In one embodiment, the multiple hierarchical strategies include intra-vector aggregation via GPU registers, inter-vector or intra-block aggregation via GPU shared memory, and inter-block aggregation via GPU global memory.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to the various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A method for optimization of machine learning (ML) workloads on a graphics processor unit (GPU) comprising:
   identifying a computation having a generic pattern commonly observed in ML processes;
   performing hierarchical aggregation spanning a memory hierarchy of the GPU for processing for the identified computation including maintaining partial output vector results in shared memory of the GPU; and
   performing hierarchical aggregation for vectors comprising performing intra-block aggregation at a register level of the GPU for multiple thread blocks of a partial output vector results on GPU global memory.

2. The method of claim 1, further comprising:
   employing an optimized fused GPU kernel to exploit temporal locality for inherent data-flow dependencies in the identified computation; and
   estimating GPU kernel launch parameters following an analytical model that maximizes thread occupancy and minimizes atomic writes to the GPU global memory.

3. The method of claim 1, wherein the generic pattern including multiple linear algebraic operators, and performing hierarchical aggregation comprises performing local aggregations when possible for reducing vector synchronization overhead.

4. The method of claim 1, wherein the GPU performs processing comprising:
   receiving an input matrix comprising a sparse matrix of row and column data;
   partitioning a block of threads, by a thread processor, into the vectors comprising sets of cooperating threads for processing the input matrix; and
   processing multiple threads in each vector on a same row of the input matrix simultaneously to determine the partial output vector results,
   wherein:
   performing hierarchical aggregation for the vectors further comprises:
      performing intra-block aggregation or inter-vector aggregation for the vectors via atomic operations; and
   performing the intra-block aggregation for the multiple thread blocks of the partial output vector results on the GPU global memory reduces atomic writes to the global memory and provides final output vector results.

5. The method of claim 4, further comprising synchronizing the vectors by determining that processing of all vectors within a block is finished before results are used in performing the intra-block aggregation for the multiple thread blocks of the vectors, wherein the inter-block aggregations for the vectors reduces synchronization overhead, and the sparse matrix comprises a compressed sparse row (CSR) matrix.

6. The method of claim 4, further comprising:
performing an inter-vector aggregation at a register level of the GPU such that threads within a vector compute the partial output vector results in GPU registers, which are subsequently aggregated using a shuffle instruction, wherein a vector of threads is responsible for processing a total of C rows, where C refers to a degree of coarsening.

7. The method of claim 4, further comprising:
for the input matrix comprising a dense matrix, performing a code generation technique that relies on unrolling to perform a majority of computations on GPU registers.

8. The method of claim 7, wherein the unrolling comprises each thread scaling elements of the input vector, and aggregating the scaled elements into a local register as a partial result of the output vector, and once all assigned rows are processed, threads within each vector propagate their partial results in the local register to the global memory of the GPU.

9. A computer program product for optimization of machine learning (ML) workloads on a graphics processor unit (GPU), the computer program product comprising a computer readable storage device having program instructions embodied therewith, the program instructions executable by a GPU to cause the GPU to:
identify, by the GPU, a computation having a generic pattern commonly observed in ML processes;
perform, by a storage processor, hierarchical aggregation spanning a memory hierarchy of the GPU for processing for the identified computation including maintaining partial output vector results in shared memory of the GPU; and
perform, by the storage processor, hierarchical aggregation for vectors comprising performing intra-block aggregation at a register level of the GPU for multiple thread blocks of a partial output vector results on GPU global memory.

10. The computer program product of claim 9, the program code further executable by the GPU to:
employ, by a kernel processor, an optimized fused GPU kernel to exploit temporal locality for inherent data-flow dependencies in the identified computation; and
estimate, by the kernel processor, GPU kernel launch parameters following an analytical model that maximizes thread occupancy and minimizes atomic writes to the GPU global memory.

11. The computer program product of claim 10, wherein the generic pattern including multiple linear algebraic operators, and performing hierarchical aggregation comprises performing, by the storage processor, local aggregations when possible for reducing vector synchronization overhead.

12. The computer program product of claim 11, wherein the program code further executable by the GPU to:
receive, by the GPU, an input matrix comprising a sparse matrix of row and column data;
partition a block of threads, by a thread processor, into the vectors comprising sets of cooperating threads for processing the input matrix;
process, by a vector processor, multiple threads in a vector on a same row of the input matrix simultaneously to determine partial output vector results; and
performing intra-vector or inter-block aggregations for the vectors via atomic operations; and
wherein the intra-block aggregation for the multiple thread blocks of the partial output vector results on the global memory reduces atomic writes to the global memory and provides final output vector results.

13. The computer program product of claim 12, wherein the program code further executable by the GPU to:
synchronize, by the vector processor, the vectors by determining that all processing of vectors within a block is finished before results are used in performing the intra-block aggregation for the multiple thread blocks of the vectors,
wherein the inter-block aggregations for the vectors reduces synchronization overhead, and the sparse matrix comprises a compressed sparse row (CSR) matrix.

14. The computer program product of claim 13, wherein:
threads within a vector compute the partial output vector results in GPU registers, which are subsequently aggregated using a shuffle instruction; and
a vector of threads is responsible for processing a total of C rows, where C refers to a degree of coarsening.

15. The computer program product of claim 12, further comprising program code executable by the GPU to:
for the input matrix comprising a dense matrix, perform, by the kernel processor, a code generation technique that relies on unrolling to perform a majority of computations on GPU registers.

16. The computer program product of claim 15, wherein the unrolling comprises each thread scaling elements of the input vector, and aggregating the scaled elements into a local register as a partial result of the output vector, and once all assigned rows are processed, threads within each vector propagate their partial results in the local register to the global memory of the GPU.

17. An apparatus comprising:
a graphics processor unit (GPU) configured to identify a computation having a generic pattern commonly observed in ML processes;
a storage processor configured to perform hierarchical aggregation spanning a memory hierarchy of the GPU to process the identified computation including maintaining partial output vector results in shared memory of the GPU; and
a vector processor configured to perform hierarchical aggregation for vectors comprising performing intra-block aggregation at a register level of the GPU for multiple thread blocks of a partial output vector results on GPU global memory.

18. The apparatus of claim 17, further comprising:
a kernel processor configured to employ an optimized fused GPU kernel to exploit temporal locality for inherent data-flow dependencies in the identified computation, and to estimate GPU kernel launch parameters following an analytical model that maximizes thread occupancy and minimizes atomic writes to the GPU global memory;
wherein:
the generic pattern includes multiple linear algebraic operators; and
the storage processor is configured to perform local aggregations when possible for reducing vector synchronization overhead.

19. The apparatus of claim 18, further comprising:
a thread processor configured to receive an input matrix comprising a sparse matrix of row and column data, and to partition a block of threads into the vectors comprising sets of cooperating threads for processing the input matrix;

a row processor configured to process multiple threads in a vector on a same row of the input matrix simultaneously to determine partial output vector results;

wherein:
  the kernel processor is further configured to perform intra-vector or inter-block aggregations for the vectors via atomic operations using the partial output vector results; and
  the intra-block aggregation for the multiple thread blocks of the partial output vector results on the global memory reduces atomic writes to the global memory and provides final output vector results.

20. The apparatus of claim 19, wherein:
the vector processor is configured to synchronize the vectors by determining that processing of all vectors within a block is finished before processing results are used to perform the intra-block aggregation for the multiple thread blocks of the vectors;

the intra-block aggregations for the vectors reduces synchronization overhead;

the sparse matrix comprises a compressed sparse row (CSR) matrix;

the thread processor is configured to process threads within a vector to compute the partial output vector results in GPU registers, which are subsequently aggregated using a shuffle instruction;

the vector processor is configured to process a vector of threads for a total of C rows, where C refers to a degree of coarsening; and for the input matrix comprising a dense matrix, the kernel processor is configured to perform a code generation technique that relies on unrolling to perform a majority of computations on GPU registers, the unrolling comprises each thread scaling elements of the input vector, aggregating the scaled elements into a local register as a partial result of the output vector, and once all assigned rows are processed, threads within each vector propagate their partial results in the local register to the global memory of the GPU.

* * * * *